(12) United States Patent
Miyazawa

(10) Patent No.: US 10,179,405 B2
(45) Date of Patent: Jan. 15, 2019

(54) PIEZOELECTRIC DRIVE DEVICE, ROBOT, AND DRIVE METHOD THEREOF

(71) Applicant: Seiko Epson Corporation, Tokyo (JP)

(72) Inventor: Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 254 days.

(21) Appl. No.: 15/045,586

(22) Filed: Feb. 17, 2016

(65) Prior Publication Data

US 2016/0241165 A1 Aug. 18, 2016

(30) Foreign Application Priority Data

Feb. 18, 2015 (JP) .................. 2015-029386

(51) Int. Cl.
*H02N 2/10* (2006.01)
*H01L 41/08* (2006.01)
*B25J 9/12* (2006.01)
*H02N 2/00* (2006.01)

(52) U.S. Cl.
CPC ............... *B25J 9/12* (2013.01); *H02N 2/004* (2013.01); *H02N 2/103* (2013.01); *Y10S 901/23* (2013.01)

(58) Field of Classification Search
CPC .................... B25J 9/12; H02N 2/103
See application file for complete search history.

(56) References Cited

U.S. PATENT DOCUMENTS

| | | | |
|---|---|---|---|
| 4,667,997 A * | 5/1987 | Udagawa | ............... B25J 13/082 294/86.4 |
| 4,983,875 A * | 1/1991 | Masaki | .................... B25J 9/046 310/317 |
| 5,191,688 A | 3/1993 | Takizawa et al. | |
| 5,453,653 A | 9/1995 | Zumeris | |
| 5,872,417 A * | 2/1999 | Sugaya | .................. H02N 2/003 310/317 |
| 6,081,063 A | 6/2000 | Kasuga et al. | |
| 7,116,037 B2 * | 10/2006 | Moteki | ............... H01L 41/0913 310/323.02 |
| 7,509,886 B2 * | 3/2009 | Horin | ......................... B25J 7/00 74/490.05 |
| 7,692,362 B2 * | 4/2010 | Lee | ...................... G02B 27/646 310/323.01 |
| 9,757,857 B2 * | 9/2017 | Miyazawa | .................. B25J 9/12 |
| 9,816,886 B2 * | 11/2017 | Inazumi | .................. G01L 5/167 |
| 2002/0014814 A1 | 2/2002 | Yasuda | |
| 2004/0256956 A1 | 12/2004 | Miyazawa | |
| 2007/0164635 A1 | 7/2007 | Witteveen et al. | |

(Continued)

FOREIGN PATENT DOCUMENTS

EP 1641053 A2 3/2006
EP 2824824 A1 1/2015

(Continued)

OTHER PUBLICATIONS

Extended European Search Report for Application No. EP 16 15 5869 dated Jun. 23, 2016 (7 pages).

*Primary Examiner* — J. San Martin
(74) *Attorney, Agent, or Firm* — Harness, Dickey & Pierce, P.L.C.

(57) ABSTRACT

A piezoelectric drive device includes a vibrating plate and multiple piezoelectric drive units that are disposed in the vibrating plate, and that respectively have a contact portion which can come into contact with a driven body.

7 Claims, 16 Drawing Sheets

(56) References Cited

U.S. PATENT DOCUMENTS

| | | | |
|---|---|---|---|
| 2008/0225089 A1 | 9/2008 | Tsukamoto | |
| 2008/0297340 A1* | 12/2008 | Popa | B25J 13/08 340/539.1 |
| 2009/0256445 A1 | 10/2009 | Kotani et al. | |
| 2009/0285664 A1* | 11/2009 | Kim | B25J 9/1612 414/730 |
| 2013/0238129 A1* | 9/2013 | Rose | F04B 9/10 700/258 |
| 2013/0255427 A1* | 10/2013 | Mizushima | B25J 18/00 74/490.03 |
| 2013/0328967 A1 | 12/2013 | Miyazawa | |
| 2014/0284951 A1* | 9/2014 | Miyazawa | B25J 15/0009 294/213 |

FOREIGN PATENT DOCUMENTS

| | | | |
|---|---|---|---|
| JP | S63-283473 A | 11/1988 | |
| JP | 63-316676 A | 12/1988 | |
| JP | 07-184382 A | 7/1995 | |
| JP | H10-225151 A | 8/1998 | |
| JP | 11-47690 A | 2/1999 | |
| JP | 2002-035696 A | 2/2002 | |
| JP | 2004-320979 A | 11/2004 | |
| JP | 2008-220171 A | 9/2008 | |
| JP | 2008-227123 A | 9/2008 | |
| JP | 2008-228458 A | 9/2008 | |
| JP | 2010-172196 A | 8/2010 | |
| JP | 5353881 B2 | 11/2013 | |
| JP | 2014-165968 A | 9/2014 | |
| WO | WO-2009-128385 A1 | 10/2009 | |

\* cited by examiner

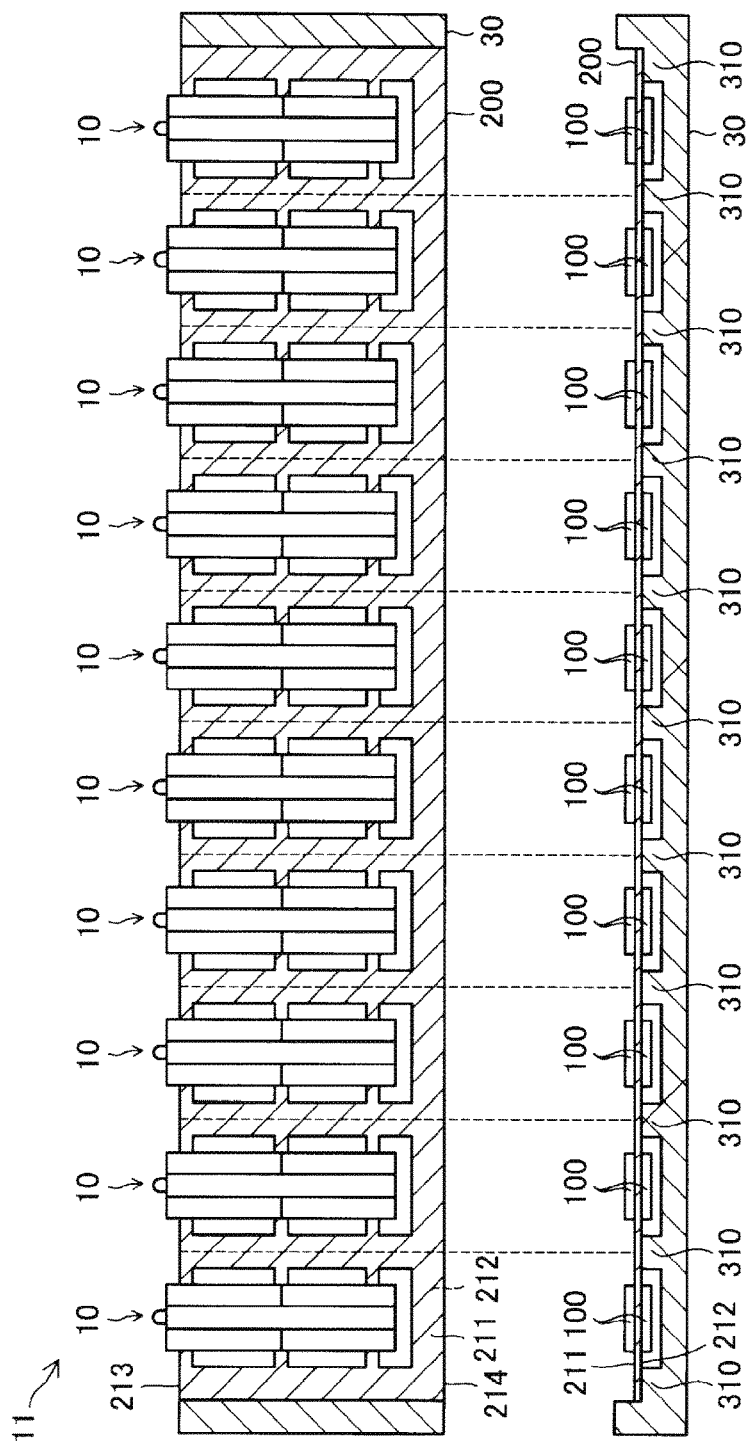

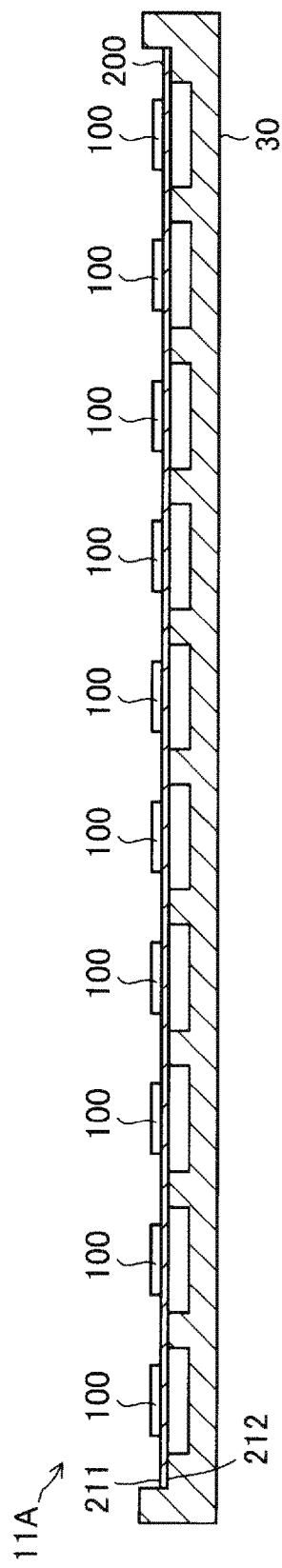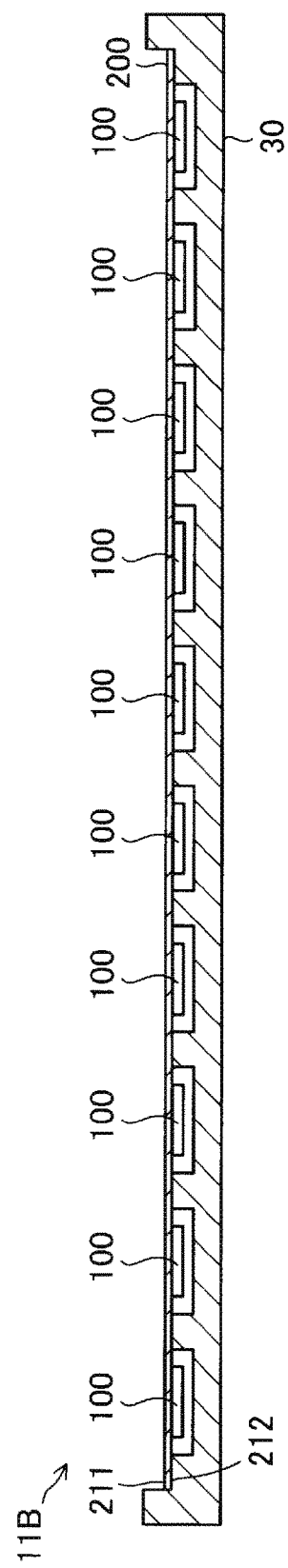

PIEZOELECTRIC DRIVE DEVICE, ROBOT, AND DRIVE METHOD THEREOF

BACKGROUND

1. Technical Field

The present invention relates to a piezoelectric drive device and various apparatuses such as a robot including a piezoelectric drive device.

2. Related Art

A piezoelectric actuator (piezoelectric drive device) which drives a driven body by vibrating a piezoelectric substance is used in various fields, since a magnet or a coil is not required (for example, JP-A-2004-320979). According to a basic configuration of the piezoelectric drive device, four piezoelectric elements are configured to be arranged in two rows and two columns on two surfaces of a reinforcing plate. Eight piezoelectric elements in total are disposed on both sides of the reinforcing plate. Each of the piezoelectric elements is a unit which interposes each piezoelectric substance between two electrodes. The reinforcing plate is used as one electrode of the piezoelectric element. One end of the reinforcing plate has a protrusion portion disposed in order to rotate a rotor by coming into contact with the rotor serving as a driven body. If an AC voltage is applied to the two piezoelectric elements arranged at opposite angles among the four piezoelectric elements, the two piezoelectric elements perform expansion and contraction movement. In response to the movement, the protrusion portion of the reinforcing plate performs reciprocating movement or elliptical movement. Then, in response to the reciprocating movement or the elliptical movement of the protrusion portion of the reinforcing plate, the rotor serving as the driven body is rotated in a predetermined rotation direction. The rotor can be rotated in the opposite direction by switching from the two piezoelectric elements to which the AC voltage is applied to the other two piezoelectric elements.

JP-A-2008-227123 is an example of the related art.

Incidentally, as a method of increasing force by which the piezoelectric drive device drives the driven body (hereinafter, referred to as a "drive force"), a method of simply using the above-described multiple piezoelectric drive devices in the related art is conceivable. However, in this case, if the multiple piezoelectric drive devices which are used are treated as one piezoelectric drive device as a whole, a problem arises in that the whole size of the piezoelectric drive device increases in proportion to the number of the piezoelectric drive devices which are used. Consequently, for example, since an arrangement space of a drive device is restricted as in a drive device for driving joints of a robot, there is a possibility that the piezoelectric drive device may be less likely to be employed as the drive device whose small size and high output power are desirable. Therefore, a suitable configuration of a miniaturized and lightweight piezoelectric drive device having high output power has not been sufficiently studied.

SUMMARY

An advantage of some aspects of the invention is to solve at least a part of the problems described above, and the invention can be implemented as the following aspects or application examples.

(1) An aspect of the invention provides a piezoelectric drive device. The piezoelectric drive device includes a vibrating plate and multiple piezoelectric drive units that are arranged and disposed in the vibrating plate, and that respectively have a contact portion which can come into contact with a driven body.

According to this aspect, the multiple piezoelectric drive units are arranged and disposed in the vibrating plate. Therefore, compared to a case where multiple piezoelectric drive devices are used as in the related art, it is possible to realize a miniaturized and lightweight piezoelectric drive device having high output power.

(2) In the piezoelectric drive device of the aspect, the multiple piezoelectric drive units may respectively have a piezoelectric vibrating body including a piezoelectric substance in which an electrode is disposed.

According to this aspect, the multiple piezoelectric drive units including the piezoelectric vibrating body including the piezoelectric substance in which the electrode is disposed are arranged and disposed in the vibrating plate. Therefore, compared to a case where multiple piezoelectric drive devices are used as in the related art, it is possible to realize a miniaturized and lightweight piezoelectric drive device having high output power.

(3) In the piezoelectric drive device of the aspect, the vibrating plate may have a first surface, a second surface, and a third surface and a fourth surface which connect the first surface and the second surface to each other. The piezoelectric vibrating body may be disposed on the first surface of the vibrating plate. The contact portion may be a protrusion portion which is disposed on the third surface or the fourth surface of the vibrating plate.

According to this aspect, the piezoelectric drive unit including the piezoelectric vibrating body is arranged and disposed on the first surface of the vibrating plate. Therefore, compared to a case where multiple piezoelectric drive devices are used as in the related art, it is possible to realize a miniaturized and lightweight piezoelectric drive device having high output power.

(4) In the piezoelectric drive device of the aspect, the piezoelectric drive unit may have the piezoelectric vibrating body which is disposed on the second surface.

According to this aspect, the piezoelectric drive unit has the two piezoelectric vibrating bodies across the vibrating plate. Therefore, it is easy to improve efficiency in vibrations of the vibrating plate.

(5) In the piezoelectric drive device of the aspect, the multiple contact portions may be disposed in one row on at least any one of the third surface and the fourth surface.

According to this aspect, each drive force generated by the vibrations of the piezoelectric vibrating body of the respective piezoelectric drive units can be efficiently transmitted to the driven body via the contact portion.

(6) In the piezoelectric drive device of the aspect, the vibrating plate having the multiple piezoelectric drive units may be stacked at multiple locations.

According to this aspect, not only the multiple piezoelectric drive units are disposed along the vibrating plate, but also the multiple piezoelectric drive units are disposed along a direction perpendicular to the vibrating plate. Accordingly, the multiple piezoelectric drive units are efficiently and two-dimensionally disposed therein. Therefore, compared to a case where multiple piezoelectric drive devices are used as in the related art, it is possible to realize a miniaturized and lightweight piezoelectric drive device having higher output power.

(7) In the piezoelectric drive device of the aspect, the electrode may include a first electrode and a second electrode. The piezoelectric vibrating body may have a substrate, the first electrode which is formed in the substrate, the piezoelectric substance which is formed in the first electrode, and the second electrode which is formed in the piezoelectric substance.

According to this aspect, the piezoelectric vibrating body can be formed into a miniaturized one. Therefore, it is possible to realize a miniaturized and lightweight piezoelectric drive device.

(8) In the piezoelectric drive device of the aspect, the vibrating plate may be configured to include the substrate.

According to this aspect, the substrate of the piezoelectric vibrating body is configured to function as the vibrating plate. Therefore, it is possible to realize a more efficient, miniaturized, and lightweight piezoelectric drive device having high output power.

(9) In the piezoelectric drive device of the aspect, the substrate may be a silicon substrate.

According to this aspect, it is possible to realize a more efficient, miniaturized, and lightweight piezoelectric drive device having high output power by using the silicon substrate. Whereas a value of a mechanical quality factor Qm of the piezoelectric substance shows several thousands, a value of a mechanical quality factor Qm of the silicon substrate shows approximately one hundred thousand. Therefore, in this case, it is possible to increase the value of the mechanical quality factor Qm of the piezoelectric vibrating body and the vibrating plate. Accordingly, it is possible to increase the value of the mechanical quality factor Qm of the piezoelectric drive device.

The invention can be implemented in various forms. For example, in addition to the piezoelectric drive device, the invention can be implemented in various aspects such as a drive method of the piezoelectric drive device, a manufacturing method of the piezoelectric drive device, a robot having the piezoelectric drive device mounted thereon, a drive method of the robot having the piezoelectric drive device mounted thereon, a liquid feeding pump, a medication pump, and the like.

BRIEF DESCRIPTION OF THE DRAWINGS

The invention will be described with reference to the accompanying drawings, wherein like numbers reference like elements.

FIGS. 1A and 1B are schematic configuration diagrams of a piezoelectric drive device according to a first embodiment.

FIGS. 6A and 6B are side views illustrating a schematic configuration of a piezoelectric drive device according to a modification example of the first embodiment.

DESCRIPTION OF EXEMPLARY EMBODIMENTS

A. First Embodiment

Figure 2A:
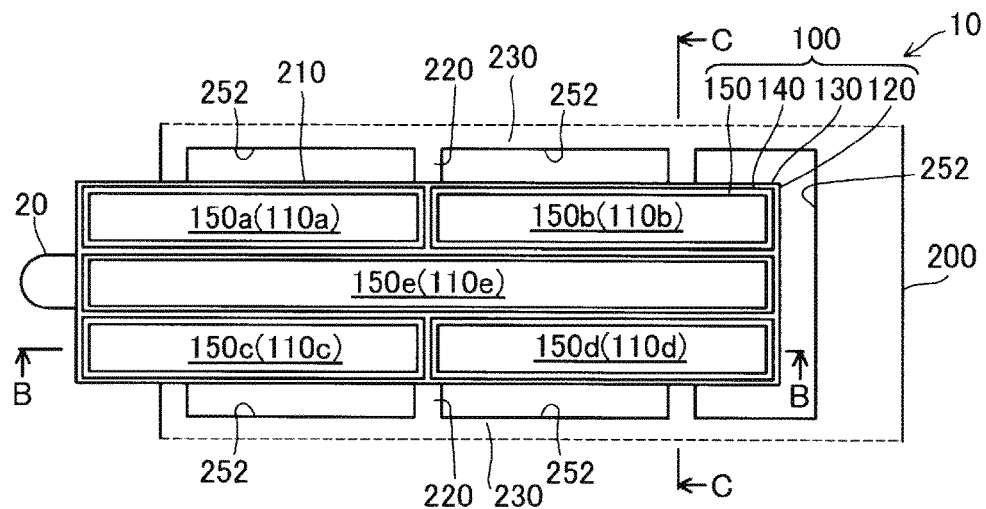
FIGS. 2A to 2C are schematic configuration diagrams of a piezoelectric drive unit.

FIGS. 1A and 1B are schematic configuration diagrams of a piezoelectric drive device 11 according to a first embodiment of the invention. FIG. 1A is a plan view of the piezoelectric drive device 11, and FIG. 1B is a side view thereof. The piezoelectric drive device 11 includes a vibrating plate 200 and multiple piezoelectric drive units 10 arranged in the vibrating plate 200. The vibrating plate 200 having the piezoelectric drive units 10 arranged therein are supported by and fixed to each support portion 310 of a support body 30. The piezoelectric drive unit 10 includes two piezoelectric vibrating bodies 100 which are respectively arranged on both surfaces of the vibrating plate 200. In FIGS. 1A and 1B, for convenience of illustration, the vibrating plate 200 and the support body 30 are hatched.

Figure 2B:
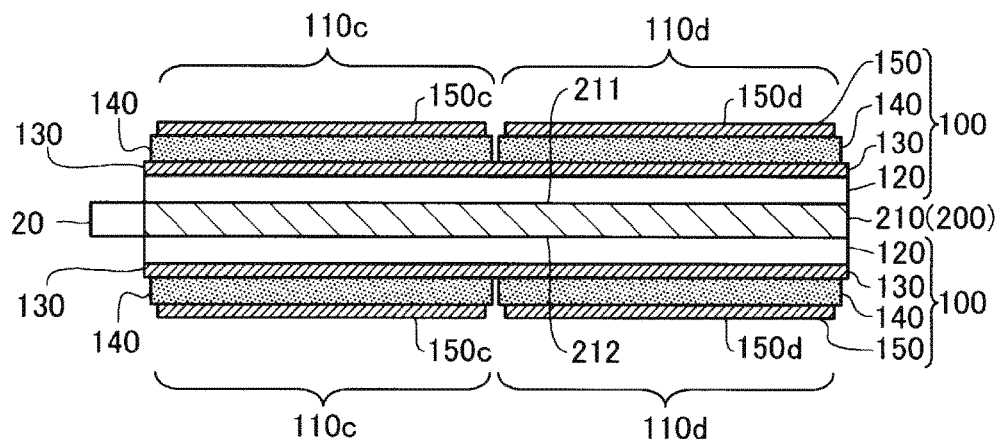
Figure 2C:
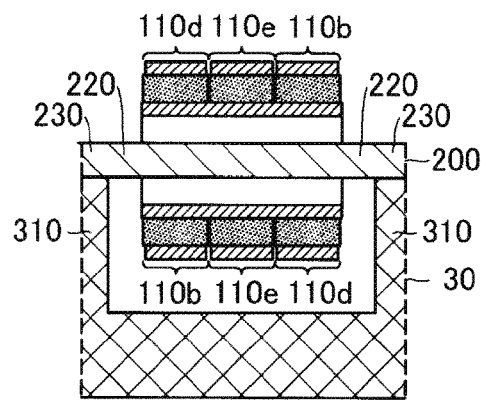

FIGS. 2A to 2C are schematic configuration diagrams of the piezoelectric drive unit 10. FIG. 2A is a plan view of the piezoelectric drive unit 10, FIG. 2B is a sectional view taken along line B-B in FIG. 2A, and FIG. 2C is a sectional view taken along line C-C in FIG. 2A. As described above, the piezoelectric drive unit 10 includes two piezoelectric vibrating bodies 100 which are respectively arranged on both surfaces (a first surface 211 (also referred to as a "front surface" or an "upper surface") and a second surface 212 (also referred to as a "rear surface" or a "lower surface")) of the vibrating plate 200. The piezoelectric vibrating body 100 includes a substrate 120, a first electrode 130 which is formed on the substrate 120, a piezoelectric substance 140, which is formed on the first electrode 130, and a second electrode 150 which is formed on the piezoelectric substance 140. The first electrode 130 and the second electrode 150 interpose the piezoelectric substance 140 therebetween. The two piezoelectric vibrating bodies 100 are arranged symmetrical to each other around the vibrating plate 200. The two piezoelectric vibrating bodies 100 have the same configuration as each other. Thus, unless otherwise specified in the following, a configuration of the piezoelectric vibrating body 100 located on an upper side of the vibrating plate 200 will be described.

The substrate 120 of the piezoelectric vibrating body 100 is used as a substrate for forming the first electrode 130, the piezoelectric substance 140, and the second electrode 150 through a film forming process. The substrate 120 also has a function as a vibrating plate for mechanical vibrating. For example, the substrate 120 can be formed of Si, $Al_2O_3$, and $ZrO_2$. For example, as the substrate 120 made of silicon (Si), it is possible to use a Si wafer for semiconductor manufacturing. According to this embodiment, a planar shape of the substrate 120 is rectangular. For example, preferably, the thickness of the substrate 120 is set to a range of 10 μm to 100 μm. If the thickness of the substrate 120 is set to 10 μm or greater, the substrate 120 can be relatively easily handled when the film forming process on the substrate 120 is performed. If the thickness of the substrate 120 is set to 100 μm or smaller, the substrate 120 can be easily vibrated in response to expansion or contraction of the piezoelectric substance 140 formed of a thin film.

The first electrode 130 is formed as one continuous conductive layer which is formed on the substrate 120. In contrast, as illustrated in FIG. 2A, the second electrode 150 is divided into five conductive layers 150a to 150e (also referred to as "second electrodes 150a to 150e"). The second electrode 150e located in the center is formed in a rectangular shape extending over the substantially whole body in the longitudinal direction of the substrate 120, in the center in the width direction of the substrate 120. The other four second electrodes 150a, 150b, 150c, and 150d have the same planar shape, and are formed at positions of four corners of the substrate 120. In an example illustrated in FIGS. 2A to 2C, both the first electrode 130 and the second electrode 150 have a rectangular planar shape. For example, the first electrode 130 or the second electrode 150 is a thin film formed by means of sputtering. For example, as a material of the first electrode 130 or the second electrode 150, it is possible to use any highly conductive material such as Aluminum (Al), nickel (Ni), gold (Au), platinum (Pt), and iridium (Ir). Instead of configuring the first electrode 130 to include one continuous conductive layer, the first electrode 130 may be divided into five conductive layers having substantially the same planar shape as that of the second electrodes 150a to 150e. Wiring (or a wiring layer and an insulating layer) for electrical connection between the second electrodes 150a to 150e, and wiring (or a wiring layer and an insulating layer) for electrical connection between the first electrode 130 and the second electrodes 150a to 150e are omitted in the illustration in FIGS. 2A to 2C.

The piezoelectric substance 140 is formed as five piezoelectric layers having substantially the same planar shape as that of the second electrodes 150a to 150e. Alternatively, the piezoelectric substance 140 may be formed as one continuous piezoelectric layer having substantially the same planar shape as that of the first electrode 130. Five piezoelectric elements 110a to 110e (refer to FIG. 2A) are configured to include a layered structure of the first electrode 130, the piezoelectric substance 140, and the second electrodes 150a to 150e.

For example, the piezoelectric substance 140 is a thin film formed using a sol-gel method or a sputtering method. As a material of the piezoelectric substance 140, it is possible to use any material which shows a piezoelectric effect, such as ceramics employing a Perovskite structure of $ABO_3$ type. For example, as the ceramics employing the Perovskite structure of $ABO_3$ type, it is possible to use lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, scandium lead niobate, and the like. For example, in addition to the ceramic, it is also possible to use a material which shows a piezoelectric effect, such as polyvinylidene fluoride, a crystal, and the like. For example, preferably, the thickness of the piezoelectric substance 140 is set to a range of 50 nm (0.05 μm) to 20 μm. A thin film of the piezoelectric substance 140 having the thickness in this range can be easily formed using a film forming process. If the thickness of the piezoelectric substance 140 is set to 0.05 μm or greater, a sufficiently strong force can be generated in response to expansion or contraction of the piezoelectric substance 140. If the thickness of the piezoelectric substance 140 is set to 20 μm or smaller, the piezoelectric vibrating body 100 (piezoelectric drive unit 10) can be sufficiently miniaturized.

Figure 3:
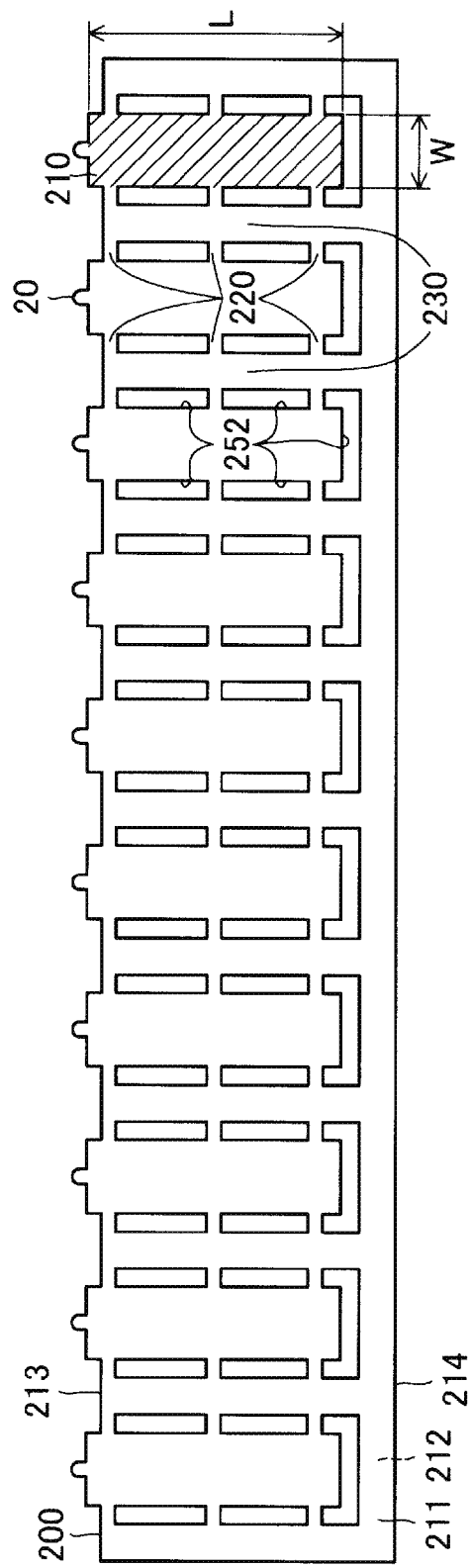
FIG. 3 is a plan view of a vibrating plate.

FIG. 3 is a plan view of the vibrating plate 200. The vibrating plate 200 has multiple rectangular vibrating body portions 210 which are formed of multiple through-holes 252, connection portions 220 which respectively triply extend from the right and left long sides of the vibrating body portion 210, and two fixing portions 230 which are respectively connected to the right and left three connection portions 220. However, in the two adjacent vibrating body portions 210, the right side connection portion 220 of the left side vibrating body portion 210 and the left side connection portion 220 of the right side vibrating body portion 210 are connected to the fixing portion 230 in common. In FIG. 3, for convenience of illustration, the vibrating body portion 210 is hatched. The fixing portion 230 is used in order to fix the piezoelectric drive device 11 to the support body 30 by using an adhesive. For example, the vibrating plate 200 can be formed of a metal material such as stainless steel, aluminum, aluminum alloy, titanium, titanium alloy, copper, copper alloy, iron-nickel alloy, and the like. In addition, the vibrating plate 200 can also be formed of a metal oxide material such as zirconia, titania, alumina, zinc oxide, and the like. In addition, the vibrating plate 200 can also be formed of ceramics, for example, Si, $SiO_2$, SiC, $Al_2O_3$, $ZrO_2$, and the like, or can also be formed of diamond.

The piezoelectric vibrating bodies 100 (refer to FIGS. 2A to 2C) respectively adhere to an upper surface (first surface) and a lower surface (second surface) of the vibrating body portion 210 by using an adhesive. Preferably, a ratio between a length L and a width W of the vibrating body portion 210 is set to L:W=approximately 7:2. The ratio is a preferred value used in order to perform ultrasonic vibrations (to be described later) by which the vibrating body portion 210 is bent to the right and left along its plane. For example, the length L of the vibrating body portion 210 can be set to a range of 0.1 mm to 30 mm. For example, the width W can be set to a range of 0.05 mm to 8 mm. Preferably, the length L is set to 50 mm or smaller in order for the vibrating body portion 210 to perform the ultrasonic vibrations. For example, the thickness (thickness of the vibrating plate 200) of the vibrating body portion 210 can be set to a range of 20 μm to 700 μm. If the thickness of the vibrating body portion 210 is set to 20 μm or greater, the vibrating body portion 210 has sufficient rigidity in order to support the piezoelectric vibrating body 100. If the thickness of the vibrating body portion 210 is set to 700 μm or smaller, the vibrating body portion 210 is enabled to have sufficiently large deformation in response to deformation of the piezoelectric vibrating body 100.

A protrusion portion 20 (also referred to as a "contact portion" or an "operation portion") corresponding to the respective piezoelectric drive units 10 is integrally disposed on one third surface 213 interposed between the first surface 211 and the second surface 212 of the vibrating plate 200. The protrusion portion 20 is a member which comes into contact with and slides on a driven body (not illustrated) so as to apply force to the driven body. The protrusion portion 20 is formed integrally with the vibrating plate 200 by using the same member. However, without being limited to this configuration, the protrusion portion 20 may be integrally disposed by using another member and by adhering to the third surface of the vibrating plate 200 using an adhesive. Preferably, the protrusion portion 20 is formed of a durable material such as ceramics (for example, Si, SiC, $Al_2O_3$, and $ZrO_2$).

As illustrated in FIG. 2C, the fixing portion 230 of the vibrating plate 200 is fixed by adhering to the support portion 310 of the support body 30 by using an adhesive. In this manner, the vibrating body portion 210 to which the piezoelectric vibrating body 100 is fixed, that is, the piezoelectric drive unit 10 is supported by the right and left support portions 310 so as to be capable of vibrating.

Figure 4:
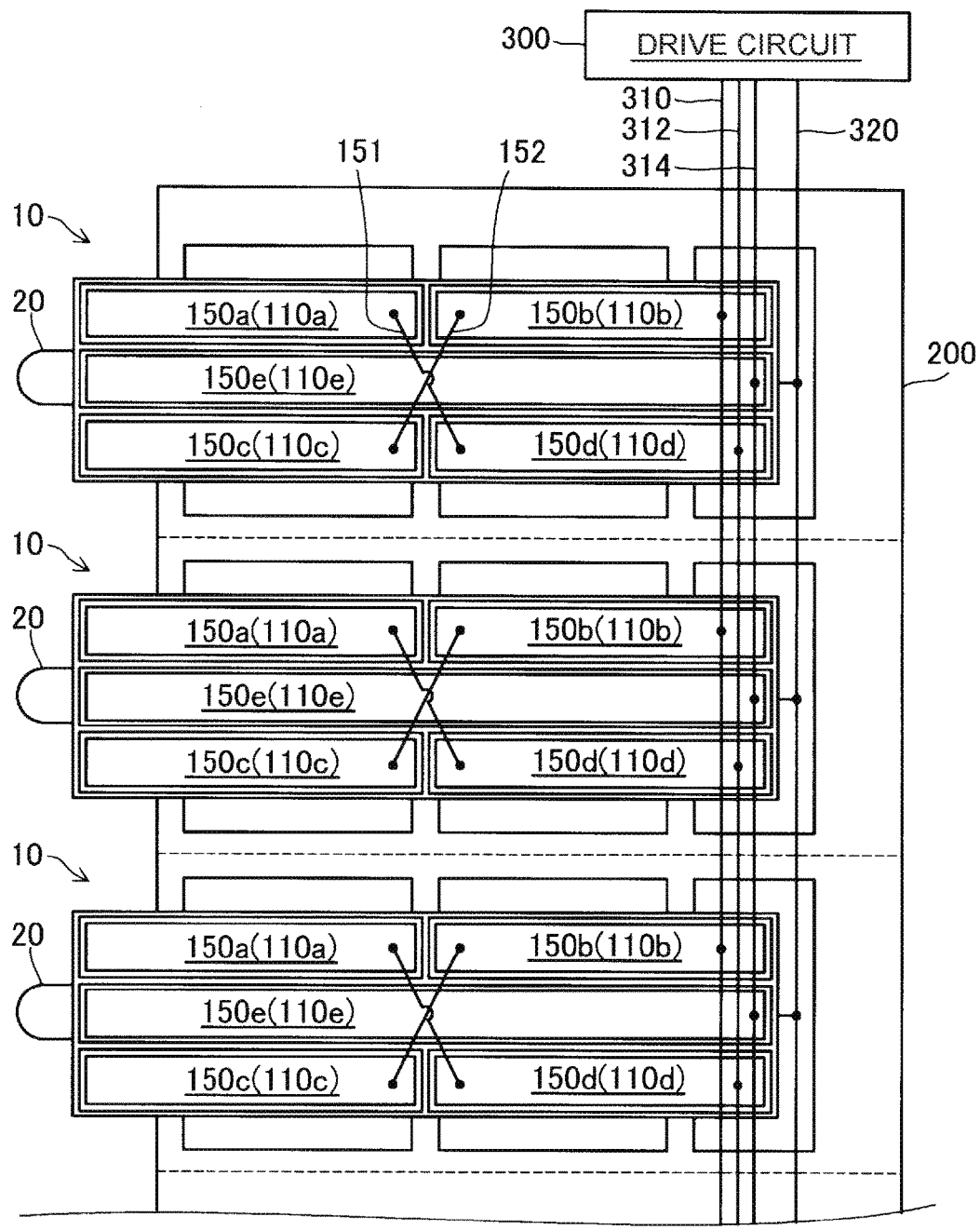
FIG. 4 is a view for describing an electrical connection state between each piezoelectric drive unit and a drive circuit.

FIG. 4 is a view for describing an electrical connection state between the respective piezoelectric drive units 10 and a drive circuit 300. In the respective piezoelectric drive units 10, among five second electrodes 150a to 150e of the piezoelectric vibrating body 100, a pair of the second electrodes 150a and 150d which are located at opposite angles are electrically connected to each other via a wire 151, and a pair of the second electrodes 150b and 150c which are located at the other opposite angles are also electrically connected to each other via a wire 152. The wires 151 and 152 may be formed using a film forming process, or may be realized by means of wire-shaped wiring. The three second electrodes 150b, 150d, and 150e located on the right side in FIG. 4 and the first electrode 130 (refer to FIGS. 2A to 2C) in the piezoelectric drive unit 10 are electrically connected to the drive circuit 300 via wires 310, 312, 314, and 320. The drive circuit 300 commonly applies a cyclically varying AC voltage or pulsating voltage between a pair of the second electrodes 150a and 150d and the first electrode 130 in the piezoelectric drive unit 10. In this manner, the respective piezoelectric drive units 10 are caused to similarly perform ultrasonic vibrations, thereby enabling a driven body coming into contact with the protrusion portion 20 to be driven. For example, when the driven body is a rotor, the rotor can be rotated in a predetermined rotation direction around the center of the rotor. In addition, when the driven body is a moving body which is movable in a predetermined direction, the moving body can be rotated in the predetermined direction. Here, the "pulsating voltage" means a voltage obtained by adding a DC offset to the AC voltage. A direction of the voltage (electric field) is one direction from one electrode toward the other electrode. The rotor which serves as the driven body and which comes into contact with the protrusion portion 20 can be rotated in the opposite direction by commonly applying the AC voltage or the pulsating voltage between the other pair of the second electrodes 150b and 150c and the first electrode 130 in the respective piezoelectric drive units 10. The moving body serving as the driven body can be moved in the opposite direction. In addition, an AC voltage or a pulsating voltage whose phases are deviated from each other by 180 degrees can be applied between a pair of the second electrodes 150a and 150d and the first electrode 130 in the respective piezoelectric drive units 10, and between the other pair of the second electrodes 150b and 150c and the first electrode 130 in the respective piezoelectric drive units 10. In this case, the phases are adjusted for the AC voltage or the pulsating voltage whose phases are deviated from each other by 180 degrees, and the AC voltage or the pulsating voltage whose phases are adjusted is applied between one second electrode 150e and the first electrode 130 in the respective piezoelectric drive units 10. In this manner, it is possible to change the rotation direction or the movement direction of the driven body in response to the adjusted phase. The voltage is simultaneously applied in the two piezoelectric vibrating bodies 100 disposed on both surfaces of the vibrating plate 200. Wiring (or a wiring layer and an insulating layer) configuring the wires 151, 152, 310, 312, 314, and 320 illustrated in FIG. 4 is omitted in the illustration in FIGS. 2A to 2C.

Figure 5:
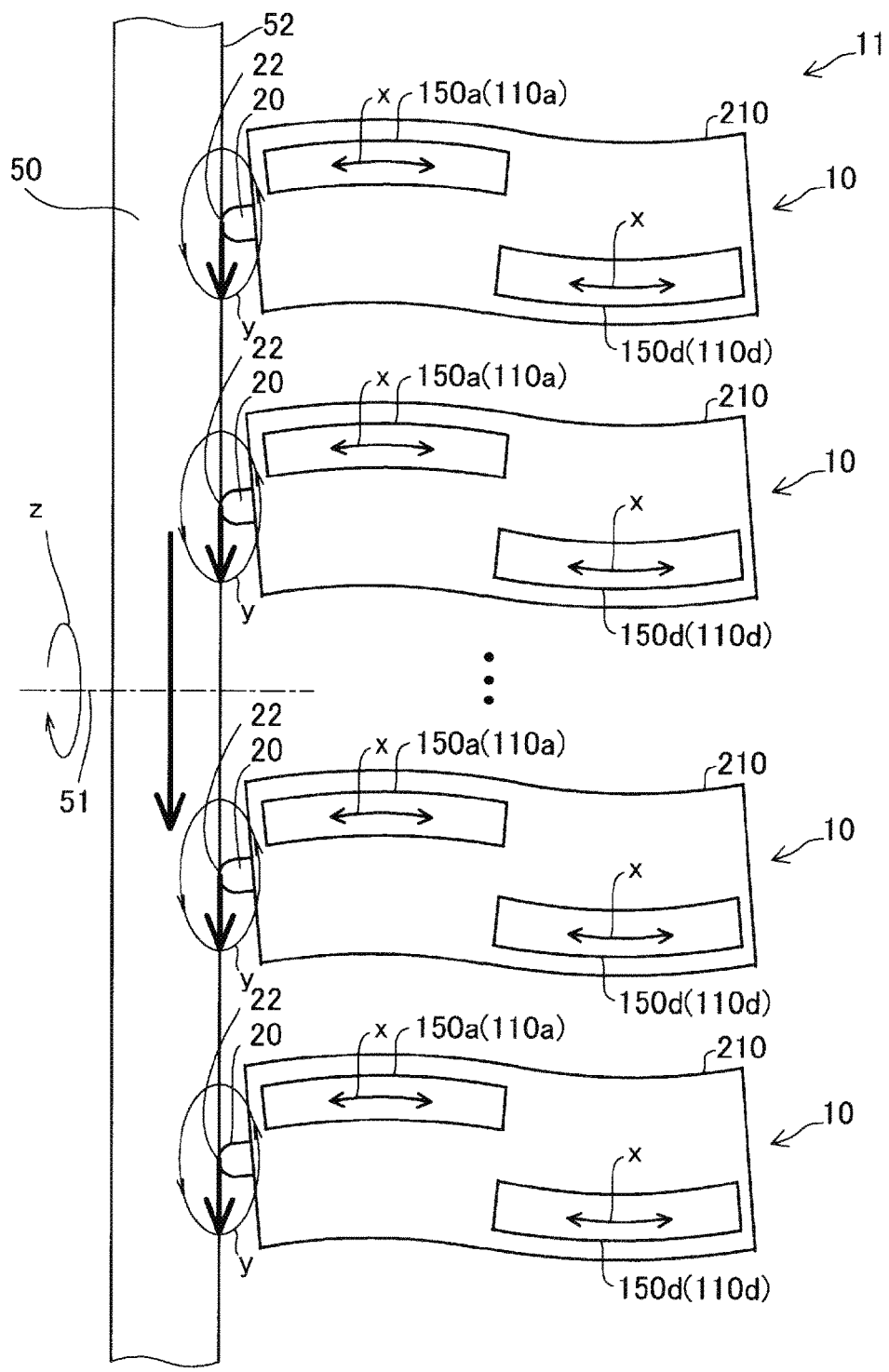
FIG. 5 is a view for describing an operation example of the piezoelectric drive device.

FIG. 5 is a view for describing an operation example of the piezoelectric drive device 11. The protrusion portion 20 of the respective piezoelectric drive units 10 is in contact with an outer peripheral side of a rotation surface (surface facing in a direction perpendicular to the paper surface) 52 perpendicular to a center 51 of the rotor 50 serving as the driven body. In the example illustrated in FIG. 5, the drive circuit 300 (refer to FIG. 4) applies the AC voltage or the pulsating voltage between a pair of the second electrodes 150a and 150d and the first electrode 130 in the respective piezoelectric drive units 10. The piezoelectric elements 110a and 110d expand and contract in a direction of an arrow x in FIG. 4. In response to this expansion and contraction, the vibrating body portion 210 of the respective piezoelectric drive units 10 is deformed into a meandering shape (S-shape) which is bent inside a plane of the vibrating body portion 210. In this manner, a distal end 22 of the protrusion portion 20 of the respective piezoelectric drive units 10 performs elliptical movement in a direction of an arrow y, based on a reciprocating movement component in a direction parallel to a rotation surface 52 of the rotor 50 (hereinafter, referred to as "bending vibrations") and a reciprocating movement component in a direction perpendicular to the rotation surface 52 (hereinafter, referred to as "longitudinal vibrations"). In this case, while the protrusion portion 20 is in contact with the rotation surface 52, the respective piezoelectric drive units 10 cause the rotation surface 52 to slide in a direction illustrated by a thick arrow, in response to a frictional force generated based on the force applied to the rotation surface 52 from the protrusion portion 20. As a result, the rotor 50 is rotated in a predetermined direction z (in FIG. 4, counterclockwise direction when viewed from the piezoelectric drive unit 10 side) around the center 51 of the rotor 50, in response to the total sum of the forces applied from the respective piezoelectric drive units 10. The three connection portions 220 of the vibrating plate 200 described with reference to FIG. 3 are disposed at a position of a vibration knot (joint) of the vibrating body portion 210 described above. When the drive circuit 300 applies the AC voltage or the pulsating voltage between the other pair of the second electrodes 150b and 150c and the first electrode 130, the distal end 22 of the protrusion portion 20 performs the elliptical movement in the opposite direction, and the rotor 50 is rotated in the opposite direction. If the same voltage as that of a pair of the second electrodes 150a and 150d (or the other pair of the second electrodes 150b and 150c) is applied to the second electrode 150e in the center, the piezoelectric drive unit 10 expands or contracts in the longitudinal direction. Accordingly, it is possible to further increase the force applied from the protrusion portion 20 to the rotor 50. This operation of the piezoelectric drive unit 10 (or the piezoelectric vibrating body 100) is disclosed in Patent Document 1 described above (JP-A-2004-320979 or corresponding U.S. Pat. No. 7,224,102), the content of which is incorporated by reference.

As described above, the piezoelectric drive device 11 according to the embodiment has a structure in which the multiple piezoelectric vibrating bodies 100 are arranged in one row on the first surface 211 of the vibrating plate 200, in which the multiple piezoelectric vibrating bodies 100 are arranged in one row on the second surface 212 so as to be paired therewith, and in which the multiple piezoelectric drive units configured to include a pair of the upper and lower piezoelectric vibrating bodies 100 are arranged in one row in the vibrating plate 200. In this manner, compared to a case where multiple piezoelectric drive devices corresponding to one piezoelectric drive unit 10 according to the embodiment are used as in the related art, it is possible to realize a lightweight and miniaturized piezoelectric drive device.

According to the embodiment, the length of the piezoelectric substance 140 can be set to a range of 0.1 mm to 30 mm, and the width W can be set to a range of 0.05 mm to 8 mm, for example. Accordingly, it is possible to realize the miniaturized piezoelectric drive unit 10. If the thickness of the piezoelectric substance 140 is set to 0.05 µm or greater, it is possible to generate sufficiently great force in response to the expansion and contraction of the piezoelectric substance 140. If the thickness of the piezoelectric substance 140 is set to 20 µm or smaller, even when a voltage applied to the piezoelectric substance 140 is 600 V or smaller, it is possible to generate sufficiently great force. Therefore, the drive circuit 300 for driving the piezoelectric drive unit 10 can be configured to include inexpensive elements. However, in practice, the sufficient voltage applied to the piezoelectric substance 140 is in a range of 20 V to 40 V. The thickness of the piezoelectric substance 140 may be set to 400 nm or greater. In this case, it is possible to increase the force generated by the piezoelectric element.

If the piezoelectric substance 140 is formed using a sol-gel method, it is preferable since a thin piezoelectric substance is easily formed. A crystal lattice direction of the piezoelectric substance is easily aligned. Accordingly, a shape of the piezoelectric substance can be greatly deformed when the same voltage is applied thereto. In addition, it is preferable since pressure resistance can be increased. The piezoelectric substance 140 may be formed using a sputtering method. The sputtering method can also achieve the same advantageous effect as that of the sol-gel method.

According to the embodiment, as the substrate 120, the piezoelectric elements (110a to 110e) are formed on the substrate having a high value of the mechanical quality factor Qm such as the substrate made of Si. Accordingly, compared to a case where this substrate 120 is not provided, it is possible to increase the value of the mechanical quality factor Qm of the piezoelectric drive unit 10. In particular, the value of the mechanical quality factor Qm of the substrate made of Si shows approximately one hundred thousands. Therefore, if the substrate 120 made of Si is used, it is possible to increase the value of the mechanical quality factor Qm of the piezoelectric drive unit 10.

According to the embodiment, the connection portions 220 which respectively triply extend from the right and left long sides of the vibrating body portion 210 are disposed (refer to FIG. 3). However, the arrangement position or the number of the connection portions 220 is not limited thereto. The arrangement position or the number can be employed in various ways. For example, a structure may be employed in which the connection portion is disposed on a short side opposite to the protrusion portion 20 of the vibrating body portion 210 so as to support the vibrating body portion 210 in a cantilever state. In a case of the cantilever structure, it is possible to omit the fixing portion 230 (refer to FIG. 3) on the lateral side of the long side of the vibrating body portion 210.

FIGS. 6A and 6B are side views illustrating a schematic configuration of piezoelectric drive devices 11A and 11B according to a modification example of the first embodiment. Similarly to FIGS. 1A and 1B, in FIGS. 6A and 6B, for convenience of illustration, the vibrating plate 200 and the support body 30 are hatched. The above-described embodiment employs the piezoelectric drive device 11 having a configuration in which the multiple piezoelectric vibrating bodies 100 are respectively arranged on both surfaces of the vibrating plate 200. However, without being limited thereto, as illustrated in FIG. 6A, the piezoelectric drive device 11A may have a configuration in which the multiple piezoelectric vibrating bodies 100 are arranged on the first surface 211 of the vibrating plate 200. Alternatively, as illustrated in FIG. 6B, the piezoelectric drive device 11A may have a configuration in which the multiple piezoelectric vibrating bodies 100 are arranged on the second surface 212 of the vibrating plate 200. Similarly to the piezoelectric drive device 11 according to the first embodiment, the piezoelectric drive devices 11A and 11B can also realize the lightweight and miniaturized piezoelectric drive device. However, it is preferable to employ the structure in which the piezoelectric vibrating bodies 100 are respectively arranged on both surfaces of the vibrating plate 200, since the respective vibrating body portions 210 of the vibrating plate 200 are more easily deformed into a meandering shape which is bent inside a plane thereof. Although not illustrated, a configuration may be adopted in which the multiple piezoelectric drive units 10 are alternately arranged on the first surface 211 and the second surface 212 of the vibrating plate 200, or a configuration may be adopted in which the multiple piezoelectric drive units 10 are properly distributed to and arranged on the first surface 211 and the second surface 212.

B. Second Embodiment

Figure 7:
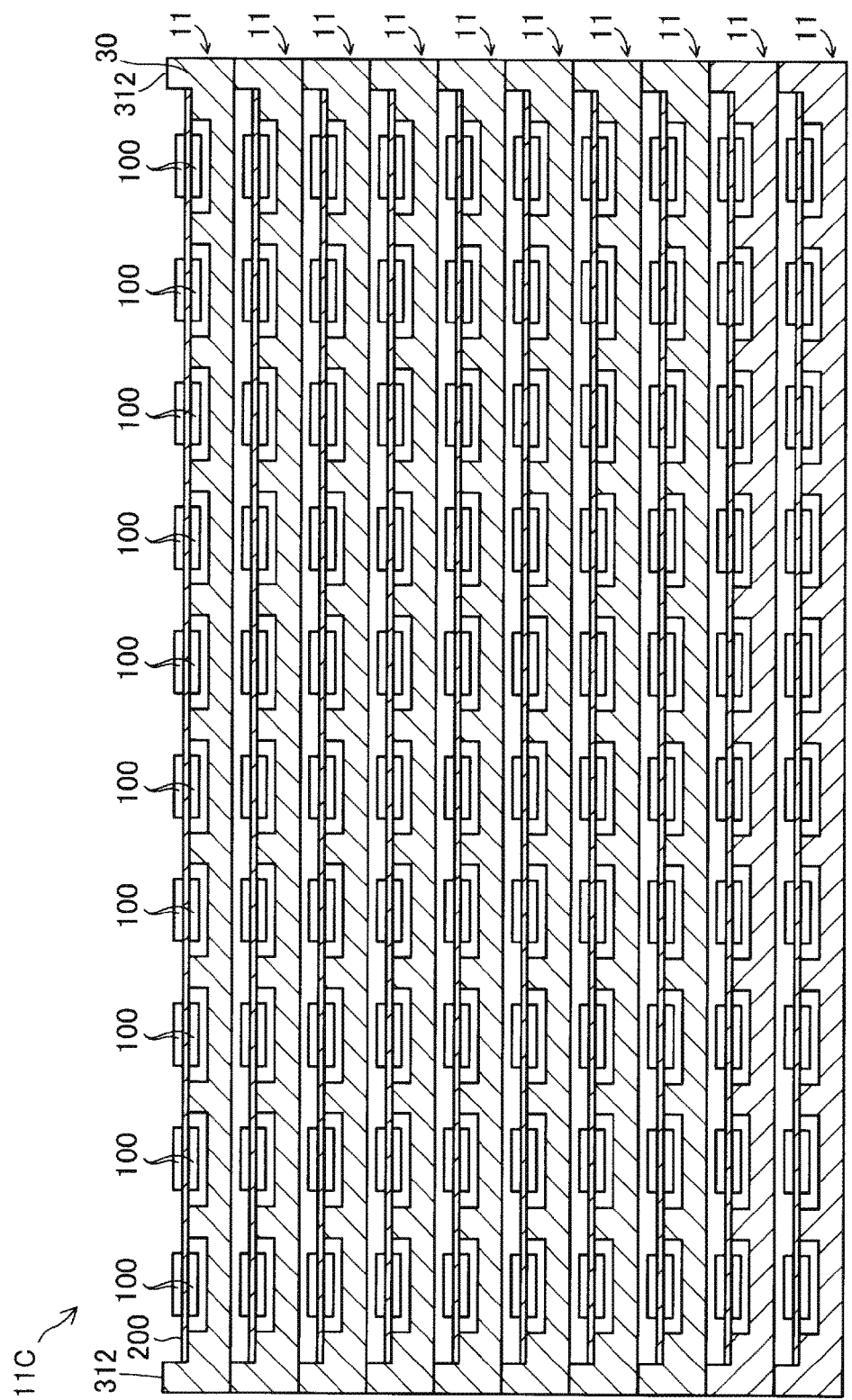
FIG. 7 is a side view illustrating a schematic configuration of a piezoelectric drive device according to a second embodiment.

FIG. 7 is a side view illustrating a schematic configuration of a piezoelectric drive device 11C according to a second embodiment. Similarly to FIGS. 1A and 1B, in FIG. 7, for convenience of illustration, the vibrating plate 200 and the support body 30 are hatched. The piezoelectric drive device 11C is configured so that the piezoelectric drive device 11 (refer to FIGS. 1A and 1B) according to the first embodiment is stacked at multiple locations along a direction perpendicular to the surface (first surface 211 and the second surface 212) on which the piezoelectric drive unit 10 is arranged. That is, the piezoelectric drive device 11C has a layered structure in which the vibrating plate 200 having the multiple piezoelectric vibrating bodies 100 arranged therein is stacked via the support body 30 at multiple locations along the direction perpendicular to the surface on which the piezoelectric vibrating body 100 is arranged. The respective piezoelectric drive devices 11 are fixed onto a support frame 312 disposed in the support body 30 of the piezoelectric drive devices 11 located immediately below by using an adhesive.

As described above, the piezoelectric drive device 11C according to the embodiment has a structure in which the piezoelectric drive device 11 having the multiple piezoelectric drive units 10 arranged in the vibrating plate 200 is stacked at multiple locations along the direction perpendicular to the surface on which the multiple piezoelectric drive units 10 are arranged. In this manner, compared to a case where multiple piezoelectric drive devices corresponding to one piezoelectric drive unit 10 according to the embodiment are used as in the related art, it is possible to realize a lightweight and miniaturized piezoelectric drive device. In the piezoelectric drive device 11 according to the first embodiment, the multiple piezoelectric drive units 10 are arranged one-dimensionally. In contrast, in the piezoelectric drive device 11C according to the second embodiment, the multiple piezoelectric drive units 10 are arranged two-dimensionally. In this manner, it is possible to more efficiently arrange the multiple piezoelectric drive units 10. Therefore, it is possible to realize a more efficient, lightweight, and miniaturized piezoelectric drive device having high output power.

C. Third Embodiment

Figure 8:
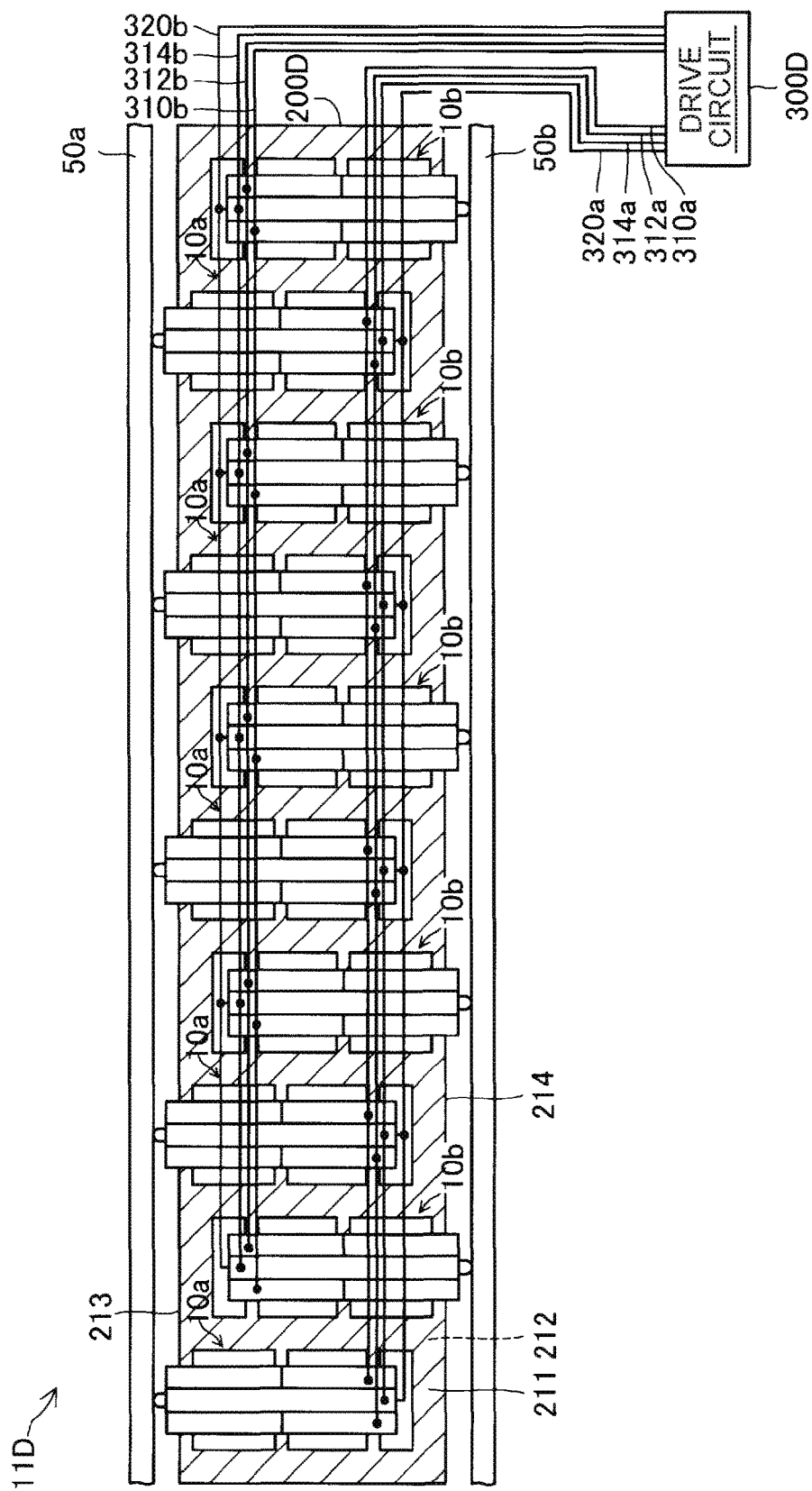
FIG. 8 is a plan view illustrating a schematic configuration of a piezoelectric drive device according to a third embodiment.

FIG. 8 is a plan view illustrating a schematic configuration of a piezoelectric drive device 11D according to a third embodiment. The piezoelectric drive device 11D has a configuration in which a first piezoelectric drive unit 10a having the protrusion portion 20 on a third surface 213 interposed between the first surface 211 and the second surface 212 in a vibrating plate 200D and a second piezoelectric drive unit 10b having the protrusion portion 20 on a fourth surface 214 opposing the third surface 213 are alternately arranged. Similarly to FIGS. 1A and 1B, in FIG. 8, for convenience of illustration, the vibrating plate 200D is hatched. However, the support body 30 is omitted.

A configuration of the first piezoelectric drive unit 10a and a configuration of the second piezoelectric drive unit 10b are the same as that of the piezoelectric drive unit 10 according to the first embodiment. However, in each of the multiple first piezoelectric drive units 10a, the three second electrodes 150b, 150d, and 150e, and the first electrode 130 (refer to FIGS. 2A to 2C) are electrically connected to a drive circuit 300D via wires 310a, 312a, 314a, and 320a. In each of the multiple second piezoelectric drive units 10b, the three second electrodes 150b, 150d, and 150e, and the first electrode 130 (refer to FIGS. 2A to 2C) are electrically connected to the drive circuit 300D via wires 310b, 312b, 314b, and 320b. Then, the multiple first piezoelectric drive units 10a and the multiple second piezoelectric drive units 10b are respectively driven by the drive circuit 300D. In the drive circuit 300D, a circuit portion for driving the multiple first piezoelectric drive units 10a and a circuit portion for driving the multiple second piezoelectric drive units 10b are similar to that in the drive circuit 300 according to the first embodiment.

According to the piezoelectric drive device 11D of the embodiment, compared to a case where multiple piezoelectric drive devices corresponding to one piezoelectric drive unit 10 according to the embodiment are used as in the related art, it is also possible to realize a lightweight and miniaturized piezoelectric drive device.

According to the piezoelectric drive device 11D, the drive circuit 300D drives the multiple first piezoelectric drive units 10a, thereby enabling a driven body 50a to be operated. The multiple second piezoelectric drive units 10b are driven, thereby enabling a driven body 50b to be driven. In this manner, the driven body 50a can be relatively operated with respect to the driven body 50b by using an operation amount which is the total sum of an operation amount of the piezoelectric drive device 11D with the driven body 50b and an operation amount of the driven body 50a with respect to the piezoelectric drive device 11D.

D. Fourth Embodiment

Figure 9A:
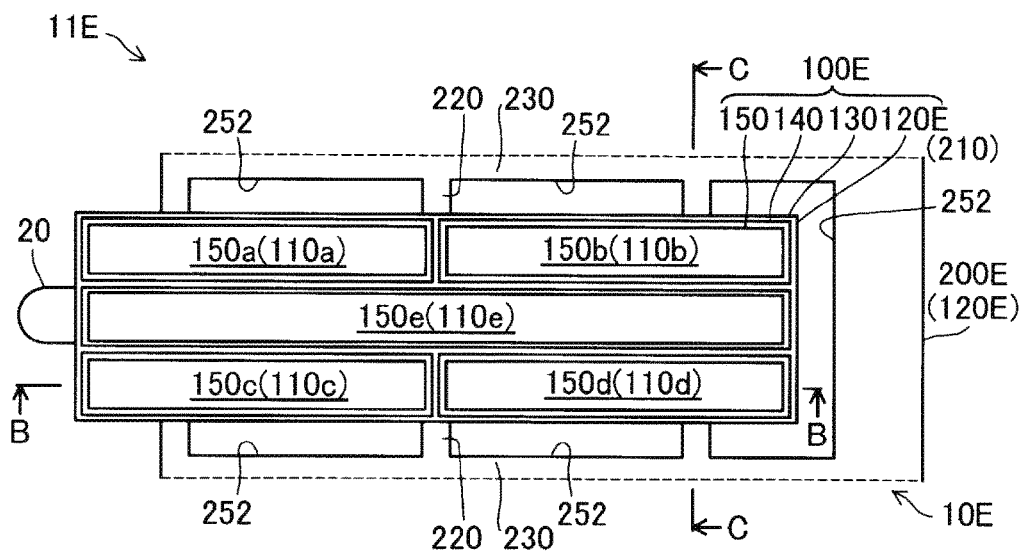
FIGS. 9A to 9C are schematic configuration diagrams of a piezoelectric drive device according to a fourth embodiment.
Figure 9B:
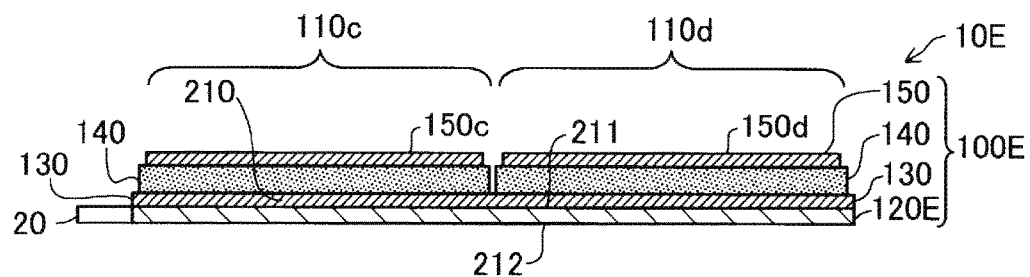
Figure 9C:
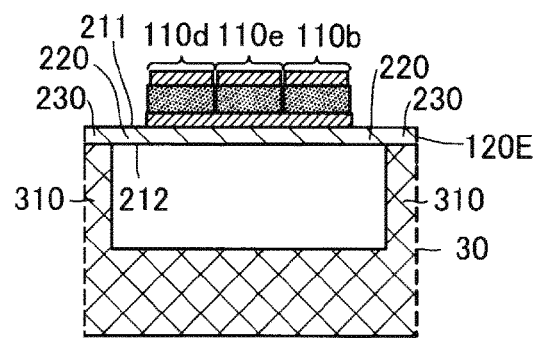

FIGS. 9A to 9C are schematic configuration diagrams of a piezoelectric drive device 11E according to a fourth embodiment, and are drawings corresponding to FIGS. 2A to 2C of the piezoelectric drive device 11 according to the first embodiment. FIG. 9A is a plan view illustrating a schematic configuration of one piezoelectric drive unit 10E within the piezoelectric drive device 11E. FIG. 9B is a sectional view taken along line B-B in FIG. 9A, and FIG. 9C is a sectional view taken along line C-C in FIG. 9A. Similarly to the piezoelectric drive device 11A (refer to FIGS. 6A and 6B) according to the modification example of the first embodiment, the piezoelectric drive device 11E is configured so that a piezoelectric vibrating body 100E functioning as the multiple piezoelectric drive unit 10E is arranged on only the first surface 211 of a vibrating plate 200E. As will be understood in comparison with FIGS. 2A to 2C, the piezoelectric vibrating body 100E has a structure from which the substrate 120 is omitted. According to this structure, through-holes 252 are formed around the multiple piezoelectric vibrating bodies 100E formed in a substrate 120E, thereby forming the vibrating body portion 210, the connection portion 220, and the fixing portion 230 in the substrate 120E. An outer shape of the substrate 120E is arranged so as to correspond to an outer shape of the vibrating plate 200E (refer to FIG. 3) and the protrusion portion 20. Then, the substrate 120E is caused to function as the vibrating plate 200E and the protrusion portion 20. The other configurations are the same as those of the piezoelectric drive device 11A in the modification example of the piezoelectric drive device 11 according to the first embodiment.

Figure 10:
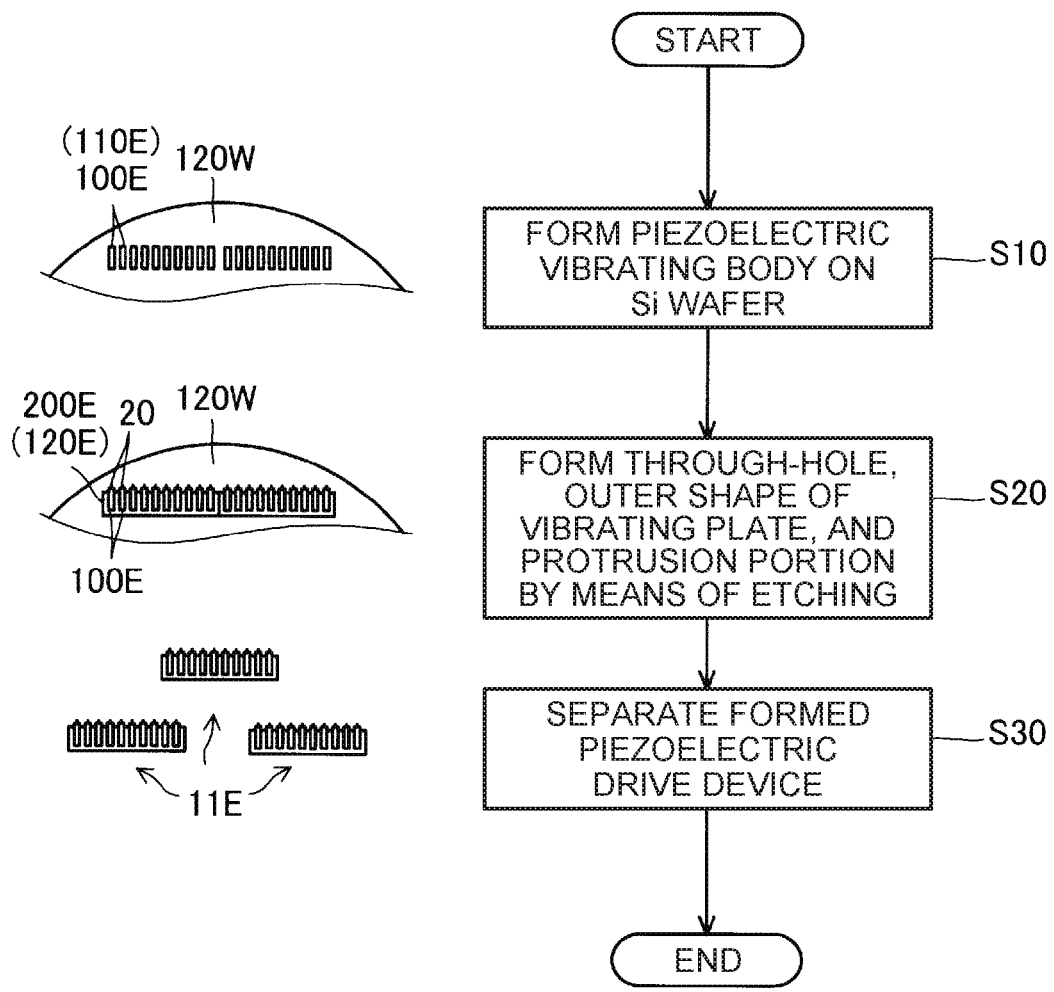
FIG. 10 is a flowchart illustrating an example of a manufacturing process of the piezoelectric drive device according to the fourth embodiment.

FIG. 10 is a flowchart illustrating an example of a manufacturing process of the piezoelectric drive device 11E. In Step S10, multiple piezoelectric elements 110E corresponding to one piezoelectric drive device 11E are formed for each of the multiple piezoelectric drive devices 11E on a Si wafer 120W serving as a substrate 120E through a film forming process, thereby forming multiple piezoelectric vibrating bodies 100E arranged for the respective piezoelectric drive devices 11E. A method of forming the piezoelectric vibrating body 100E is the same as that of the piezoelectric vibrating body 100 (refer to FIGS. 2A to 2C) according to the first embodiment. Thus, description thereof will be omitted herein. In a case of silicon (Si), a value of the mechanical quality factor Qm is as great as approximately one hundred thousands. Accordingly, it is possible to increase the mechanical quality factor Qm of the piezoelectric vibrating body 100E (piezoelectric drive unit 10E) and the vibrating plate 200E. In Step S20, an outer shape of the vibrating plate 200E and the protrusion portion 20 are formed in a portion of the substrate 120E corresponding to the respective piezoelectric drive devices 11E on the Si wafer 120W by means of etching. The through-holes 252 are formed around the respective piezoelectric vibrating bodies 100E, thereby forming the vibrating body portion 210, the connection portion 220, and the fixing portion 230. In this manner, the multiple piezoelectric drive devices 11E are formed on the Si wafer 120W. In Step S30, the multiple piezoelectric drive devices 11E formed on the Si wafer 120W are separated from each other by means of laser dicing. As a result, the multiple piezoelectric drive devices 11E can be manufactured at a time by using a single sheet of the Si wafer 120W.

Figure 11:
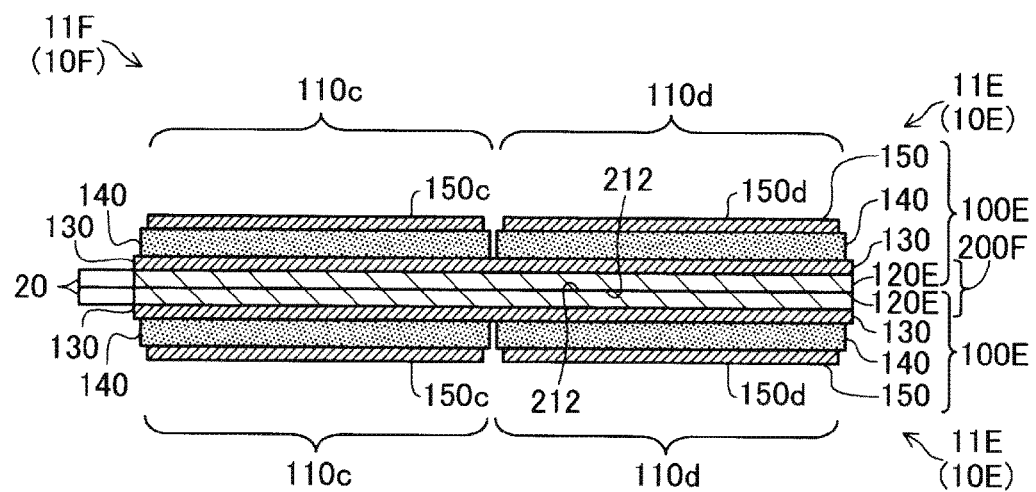
FIG. 11 is a sectional view illustrating a schematic configuration of a piezoelectric drive device according to a modification example of the fourth embodiment.

FIG. 11 is a sectional view illustrating a schematic configuration of one piezoelectric drive unit 10F within a piezoelectric drive device 11F according to a modification example of the fourth embodiment. FIG. 11 corresponds to the sectional view in FIG. 9B, which is taken along line B-B in FIG. 9A. The piezoelectric drive device 11F has a configuration in which the two piezoelectric drive devices 11E (refer to FIGS. 9A to 9C) adhere to the second surface 212 of the substrate 120E serving as the vibrating plate 200E so that the respective piezoelectric drive units 10E are vertically symmetrical. The piezoelectric drive device 11F corresponds to the piezoelectric drive device 11 (refer to FIGS. 2A to 2C) according to the first embodiment.

As described above, according to the piezoelectric drive device 11E of the embodiment, the piezoelectric drive device in which the multiple piezoelectric vibrating bodies 100E serving as the multiple piezoelectric drive units 10E are arranged in the vibrating plate 200E can be integrally formed on the Si substrate 120E through a film forming process. The piezoelectric drive device 11F can be integrally formed by causing the piezoelectric drive device 11E to adhere thereto. The piezoelectric drive device 11E can be precisely manufactured on the Si wafer 120W through a film forming process. Accordingly, compared to the piezoelectric drive devices 11, 11A, and 11B according to the first embodiment and the modification example, it is possible to realize a further miniaturized and more lightweight piezoelectric drive device. In addition, the multiple piezoelectric drive devices 11E can be simultaneously formed on a single sheet of the Si wafer 120W through a film forming process. Therefore, it is possible to improve manufacturing efficiency.

An example has been described in which the piezoelectric drive device 11F according to the modification example is formed by causing the piezoelectric drive device 11E according to the embodiment to adhere thereto. However, a piezoelectric drive device can also be manufactured by forming the piezoelectric vibrating body 100E on the second surface 212 side of the substrate 120E of the piezoelectric drive device 11E, similarly to the first surface 211 side, though a film forming process.

In the embodiment and the modification example, an example has been described in which the substrate made of Si is used as the substrate of the piezoelectric vibrating body so as to function as the vibrating plate. However, without being limited thereto, the substrate of the piezoelectric vibrating body and the vibrating plate may be integrally formed by using various substrates which can be used as the substrate for a film forming process.

E. Fifth Embodiment

In order that the substrate made of Si is used as the substrate of the piezoelectric vibrating body and functions as the vibrating plate, the fourth embodiment employs the piezoelectric drive device 11E (refer to FIGS. 9A to 9C) in which the piezoelectric drive device having the piezoelectric vibrating body and the vibrating plate which are integrally formed using a film forming process is fixed by adhering to the support portion 310 of the support body 30. In contrast, as will be described below, the piezoelectric vibrating body and the vibrating plate are integrally formed using the film forming process. In addition to this integral forming, the support body can also be further integrally formed.

Figure 12A:
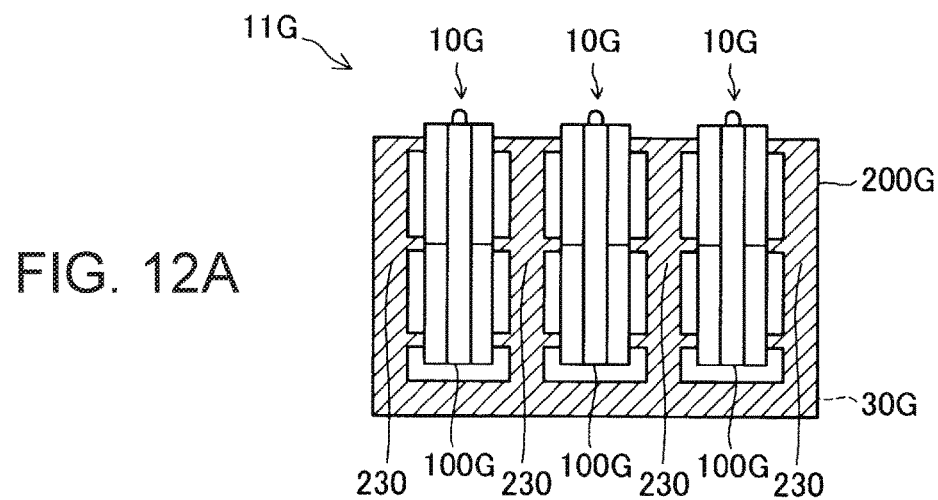
FIGS. 12A and 12B are schematic configuration diagrams of a piezoelectric drive device according to a fifth embodiment.
Figure 12B:
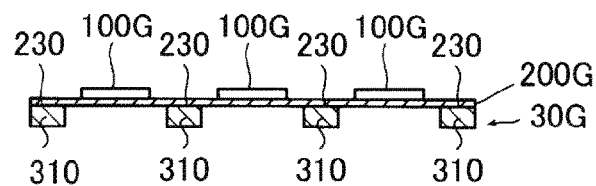
Figure 13A:
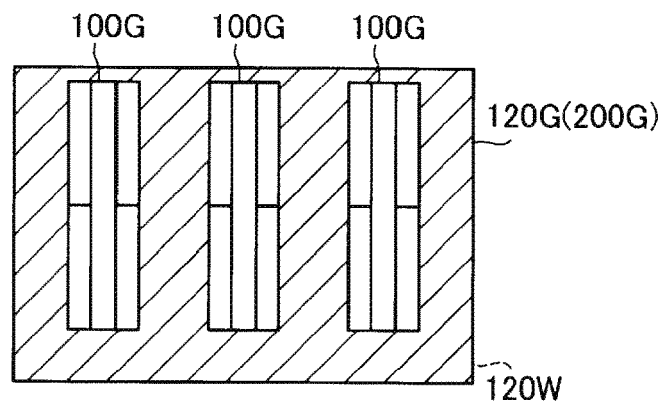
FIGS. 13A and 13B are views for describing one part of an example of a manufacturing process of the piezoelectric drive device according to the fifth embodiment.
Figure 13B:
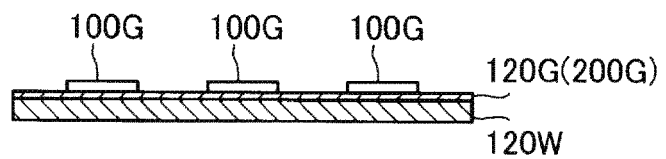

FIGS. 12A and 12B are schematic configuration diagrams of a piezoelectric drive device 11G according to a fifth embodiment, and are drawings corresponding to FIGS. 1A and 1B according to the first embodiment. FIG. 12A is a plan view of the piezoelectric drive device 11G, and FIG. 12B is a side view thereof. In order to facilitate the following illustration and description, FIGS. 12A and 12B illustrate a configuration example in which three piezoelectric drive units 10G are arranged in a vibrating plate 200G. However, without being limited thereto, a configuration can be adopted in which various numbers of piezoelectric drive units 10G are arranged in the vibrating plate 200G.

Similarly to the piezoelectric drive device 11E (refer to FIGS. 9A to 9C), the piezoelectric drive device 11G is configured so that a piezoelectric vibrating body 100G serving as the piezoelectric drive unit 10G is integrally formed on an upper surface (first surface) of the vibrating plate 200G. The support portion 310 configuring a support body 30G is integrally formed at a position corresponding to the fixing portion 230 on a lower surface (second surface) of the vibrating plate 200G. Similarly to the piezoelectric drive device 11E, the piezoelectric drive device 11G can be manufactured using the film forming process.

FIGS. 13A to 15C are views for describing an example of a manufacturing process of the piezoelectric drive device 11G. First, as illustrated in a side view of FIG. 13B, a SiO$_2$ layer 120G serving as the vibrating plate 200G is formed by oxidizing the upper surface of the Si wafer 120W. As illustrated in a plan view of FIG. 13A, the piezoelectric vibrating body 100G is formed on the upper surface. A method of forming the piezoelectric vibrating body 100G is the same as that of the piezoelectric vibrating body 100 (refer to FIGS. 2A to 2C) according to the first embodiment. Thus, description thereof will be omitted herein. The vibrating plate 200G may be formed by forming alumina on the upper surface of the Si wafer 120W.

Figure 14A:
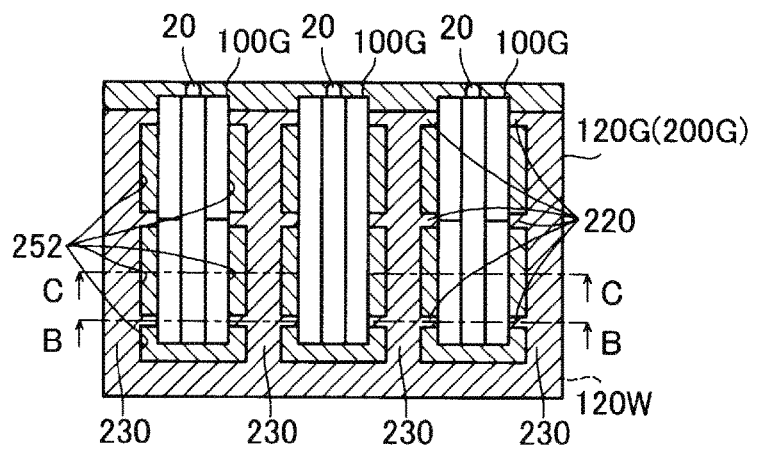
FIGS. 14A to 14C are views for describing another part of the example of the manufacturing process of the piezoelectric drive device according to the fifth embodiment.
Figure 14B:
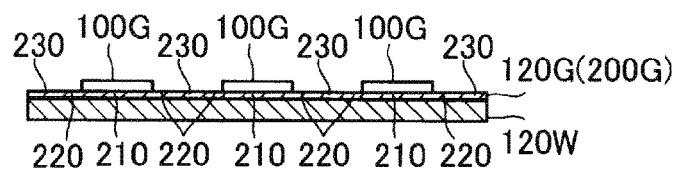
Figure 14C:
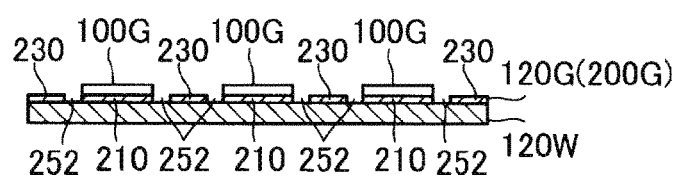

Next, as illustrated in a plan view of FIG. 14A, a sectional view of FIG. 14B which is taken along line B-B in FIG. 14A, and a sectional view of FIG. 14C which is taken along line C-C in FIG. 14A, a portion of the SiO$_2$ layer 120G (vibrating plate 200G) around the respective piezoelectric vibrating bodies 100G is removed by means of etching, thereby forming the protrusion portion 20, the vibrating body portion 210, the connection portion 220, and the fixing portion 230.

Figure 15A:
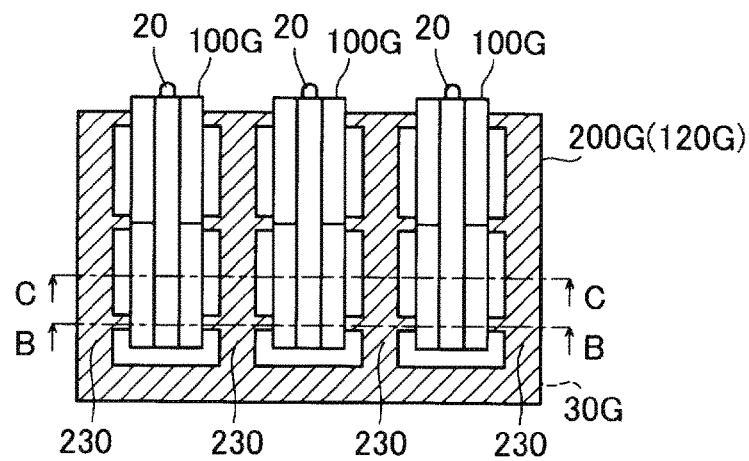
FIGS. 15A to 15C are views for describing further another part of the example of the manufacturing process of the piezoelectric drive device according to the fifth embodiment.
Figure 15B:
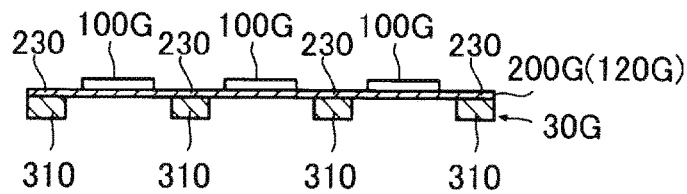
Figure 15C:
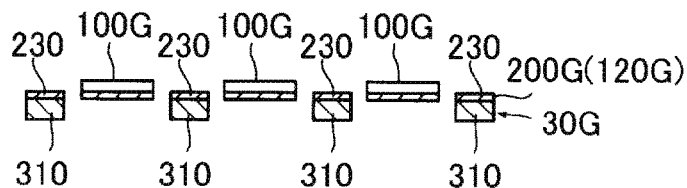

Next, as illustrated in a plan view of FIG. 15A, a sectional view of FIG. 15B which is taken along line B-B in FIG. 15A, and a sectional view of FIG. 15C which is taken along line C-C in FIG. 15A, in order that a portion of the Si wafer 120W which corresponds to the fixing portion 230 along a long side direction of the vibrating body portion 210 of the vibrating plate 200G (SiO$_2$ layer 120G) remains as the support portion 310, the other portion is removed by means of etching, and the support body 30G is formed. In this manner, it is possible to manufacture the piezoelectric drive device 11G (refer to FIGS. 12A and 12B) in which the support body 30G is integrally formed.

Although the illustration is omitted, as described in the fourth embodiment, the multiple piezoelectric drive devices 11G can be formed on the Si wafer 120W. Accordingly, the multiple piezoelectric drive devices 11G are separated by means of laser dicing. In this manner, the multiple piezoelectric drive devices 11E can be manufactured at a time by using a single sheet of the Si wafer 120W.

F. Sixth Embodiment

Figure 16:
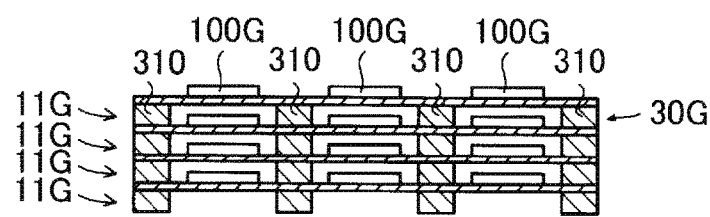
FIG. 16 is a side view illustrating a schematic configuration of a piezoelectric drive device according to a sixth embodiment.

FIG. 16 is a side view illustrating a schematic configuration of a piezoelectric drive device 11H according to a sixth embodiment, and is a drawing corresponding to FIG. 7 according to the second embodiment. The piezoelectric drive device 11H has a layered structure in which the piezoelectric drive device 11G (refer to FIGS. 12A and 12B) is stacked on the other piezoelectric drive device 11G via the support portion 310 of a support body 30G so as to stack the multiple piezoelectric drive devices 11G on one another. In the respective piezoelectric drive devices 11G, a lower surface of the support portion 310 of the upper side piezoelectric drive device 11G and the vibrating plate 200G of the lower side piezoelectric drive device 11G adhere to each other by using an adhesive.

G. Embodiment of Device Employing Piezoelectric Drive Device

The above-described piezoelectric drive devices 11 to 11H apply a great force to the driven body by utilizing resonance, and can be applied to various devices. For example, the piezoelectric drive devices 11 to 11H can be used as a drive device for various apparatuses such as a robot (also including an electronic component conveying apparatus (IC handler)), a medication pump, a timepiece calendar feeding device, a printing apparatus (for example, a sheet feeding mechanism. However, not applicable to a head since the vibration plate is not caused to resonate in the piezoelectric drive device used for the head). Hereinafter, a representative embodiment will be described.

Figure 17:
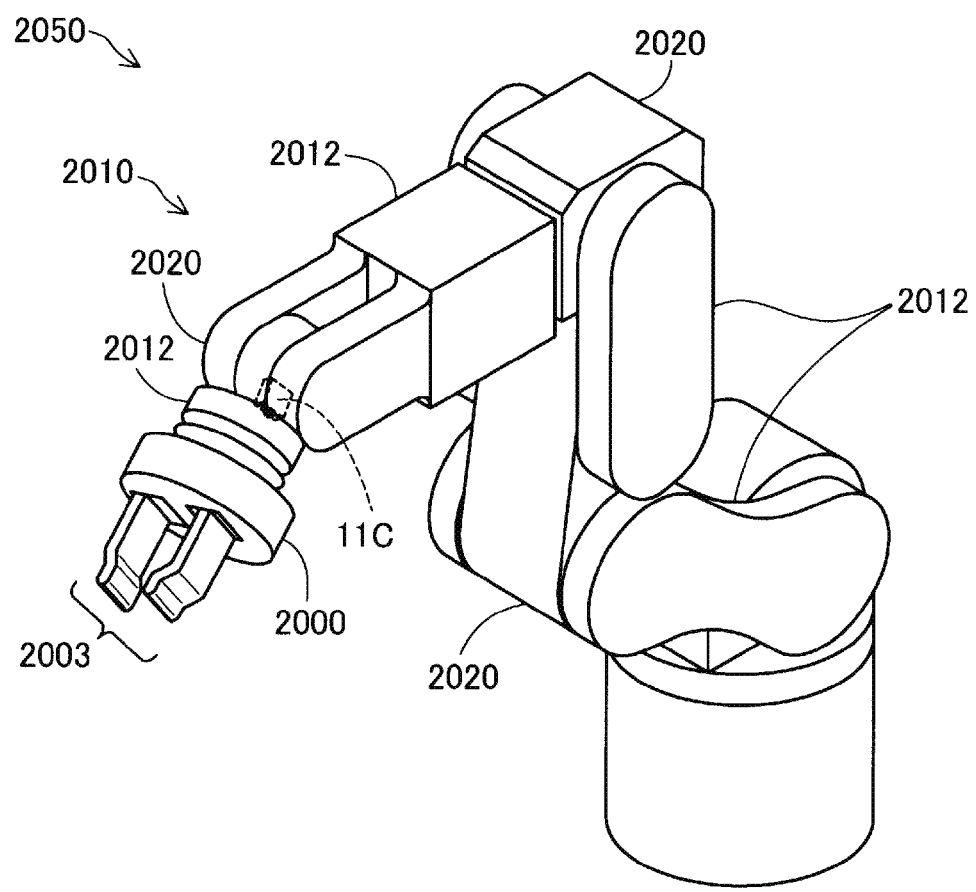
FIG. 17 is a view for describing an example of a robot which uses a piezoelectric drive device.

FIG. 17 is a view for describing an example of a robot 2050 which employs the above-described piezoelectric drive device 11C. The robot 2050 has an arm 2010 (also referred to as an "arm unit") which includes multiple link portions 2012 (also referred to as a "link member") and multiple joint portions 2020 for connecting the link portions 2012 to each other in a pivotable or bendable state. The above-described piezoelectric drive device 11C is incorporated in the respective joint portions 2020, and the joint portions 2020 can be pivotally moved or bent at any desired angle by using the piezoelectric drive device 11C. A robot hand 2000 is connected to a distal end of the arm 2010. The robot hand 2000 includes a pair of gripping portions 2003. The piezoelectric drive device 11C is also incorporated in the robot hand 2000. The robot hand 2000 can grip an object by using the piezoelectric drive device 11C so as to open and close the gripping portions 2003. The piezoelectric drive device 11C is also disposed between the robot hand 2000 and the arm 2010. The robot hand 2000 can be rotated with respect to the arm 2010 by using the piezoelectric drive device 11C.

Figure 18:
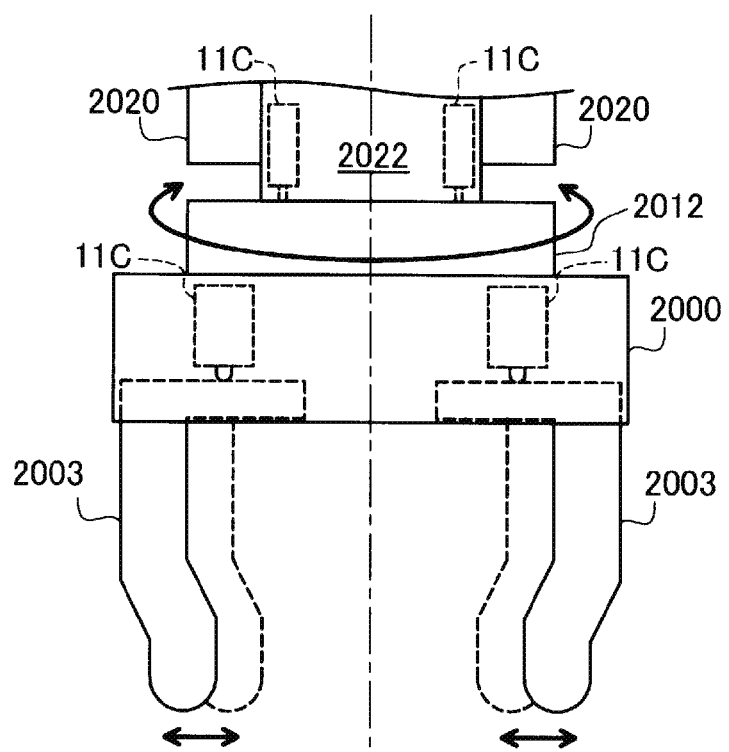
FIG. 18 is a view for describing a wrist portion of the robot.

FIG. 18 is a view for describing a wrist portion of the robot 2050 illustrated in FIG. 17. The joint portions 2020 on the wrist interpose a wrist pivotally moving portion 2022 therebetween, and the link portion 2012 on the wrist is attached to the wrist pivotally moving portion 2022 so as to be pivotally movable around a central axis O of the wrist pivotally moving portion 2022. The wrist pivotally moving portion 2022 includes the piezoelectric drive device 11C. The piezoelectric drive device 11C pivotally moves the link portion 2012 on the wrist and the robot hand 2000 around the central axis O. The multiple gripping portions 2003 are erected in the robot hand 2000. A proximal end portion of the gripping portion 2003 is movable inside the robot hand 2000. The piezoelectric drive device 11C is mounted on a base portion of the gripping portion 2003. Therefore, the gripping portions 2003 are moved so as to grip a target by operating the piezoelectric drive device 11C.

As the robot, without being limited to a single arm robot, the piezoelectric drive device 11C can also be applied to a multi-arm robot in which the number of arms is two or more. Here, in addition to the piezoelectric drive device 11C, the joint portion 2020 on the wrist or the inside of the robot hand 2000 includes a power line for supplying power to various devices such as a force sensor and a gyro sensor or signal line for transmitting a signal. Accordingly, enormous wiring is needed. Therefore, it was very difficult to arrange the wiring inside the joint portion 2020 or the robot hand 2000. However, the piezoelectric drive device 11C according to the above-described embodiment can decrease a drive current compared to a normal electric motor or the piezoelectric drive device in the related art. Therefore, it is possible to arrange the wiring even in a small space such as the joint portion 2020 (particularly, a distal end joint portion of the arm 2010) and the robot hand 2000. In addition, the piezoelectric drive device 11C has a miniaturized and lightweight structure. Accordingly, compared to a case of using multiple piezoelectric drive devices needed to obtain the same output power in the related art, the piezoelectric drive device 11C is more easily incorporated in the joint portion 2020 or the robot hand 2000. The output power needed to operate the joint portion 2020 or the robot hand 2000 is easily generated.

Figure 19:
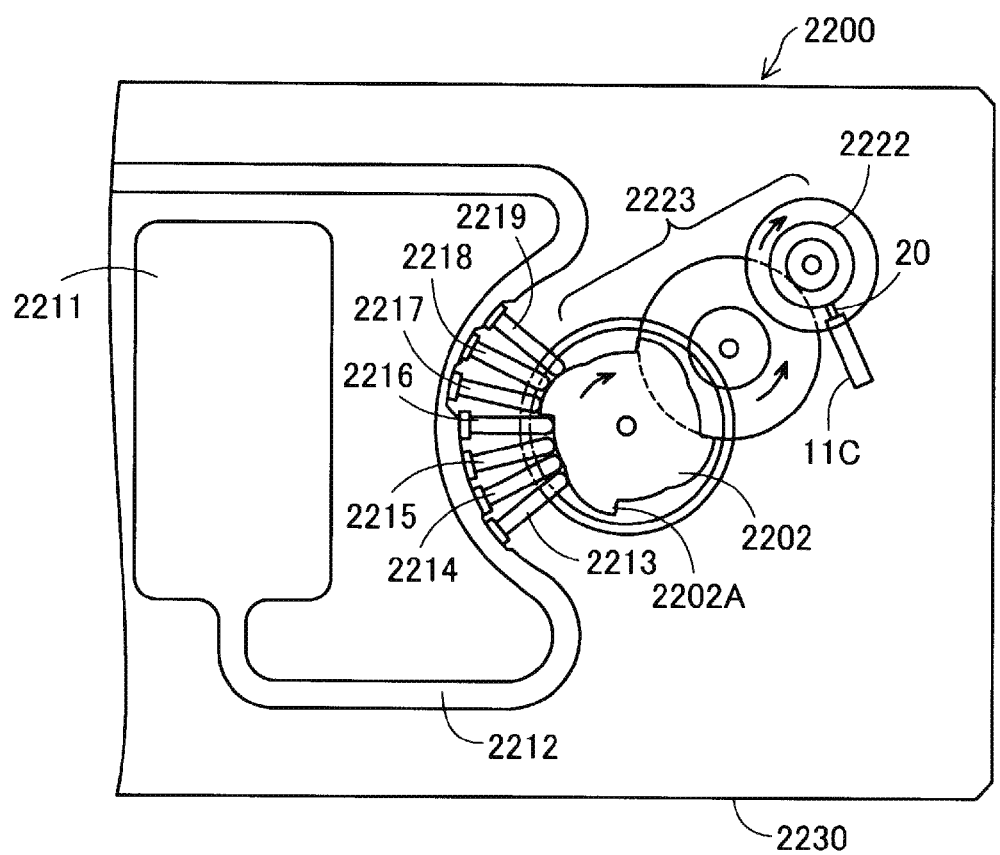
FIG. 19 is a view for describing an example of a liquid feeding pump which uses a piezoelectric drive device.

FIG. 19 is a view for describing an example of a liquid feeding pump 2200 employing the above-described piezoelectric drive device 11C. In the liquid feeding pump 2200, a case 2230 internally has a reservoir 2211, a tube 2212, the piezoelectric drive device 11C, a rotor 2222, a deceleration transmission mechanism 2223, a cam 2202, and multiple fingers 2213, 2214, 2215, 2216, 2217, 2218, and 2219. The reservoir 2211 is an accommodation section for accommodating a liquid which is a transport target. The tube 2212 is used in order to transport the liquid fed from the reservoir 2211. The multiple protrusion portions 20 of the piezoelectric drive device 11C are disposed in a state of being pressed against a side surface of the rotor 2222, and the piezoelectric drive device 11C rotatably drives the rotor 2222. A rotation force of the rotor 2222 is transmitted to the cam 2202 via the deceleration transmission mechanism 2223. The fingers 2213 to 2219 are members for blocking the tube 2212. If the cam 2202 is rotated, the fingers 2213 to 2219 are sequentially pressed radially outward by a protrusion portion 2202A of the cam 2202. The fingers 2213 to 2219 block the tube 2212 sequentially from the upstream side (reservoir 2211 side) in the transport direction. In this manner, the liquid inside the tube 2212 is sequentially transported to the downstream side. According to this configuration, an extremely small amount of the liquid can be accurately fed. Moreover, a miniaturized liquid feeding pump 2200 can be realized. An arrangement of each member is not limited to the illustrated example. A configuration may be adopted in which a ball disposed in the rotor 2222 blocks the tube 2212 without providing a member such as the fingers. The above-described liquid feeding pump 2200 can be utilized for a drug dispensing apparatus which administers a drug solution such as insulin to a human body. Here, a drive current is decreased by using the piezoelectric drive device 11C according to the above-described embodiment, compared to the piezoelectric drive device in the related art. Accordingly, it is possible to minimize power consumption of the drug dispensing apparatus. Therefore, the piezoelectric drive device 11C is particularly effective when the drug dispensing apparatus is driven by a battery.

Without being limited to the above-described embodiments, application examples, and modification examples, the invention can be realized using various configurations within the scope not departing from the gist of the invention. For example, technical features in the embodiments, application examples, and modification examples which correspond to technical features in each form described in the summary of the invention can be appropriately replaced or combined with each other in order to partially or entirely solve the above-described problem, or in order to partially or entirely achieve the above-described advantageous effect. Unless the technical features are described herein as essential, the technical features can be appropriately deleted.

The entire disclosure of Japanese Patent Application No. 2015-029386, filed Feb. 18, 2015 is expressly incorporated by reference herein.

What is claimed is:

1. A piezoelectric drive device comprising:
   a single vibrating plate, an outer periphery of the single vibrating plate being in a longitudinal rectangular shape having top and bottom surfaces, first and second sides opposite to each other, and third and fourth sides opposite to each other, the first and second sides being longer than the third and fourth sides, the single vibrating plate having a plurality of through-holes; and
   a plurality of piezoelectric drive units that are disposed on the single vibrating plate, each of the plurality of piezoelectric units having:
      a first set of piezoelectric elements that are provided on one of the top and bottom surfaces of the single vibrating plate;
      a second set of piezoelectric elements that are provided on the other of the top and bottom surfaces of the single vibrating plate; and
      a first projection that is configured to contact a driven body so as to drive the driven body,
   wherein the plurality of first projections of the plurality of piezoelectric drive units are all outwardly projected from the first side of the single vibrating plate and are all provided only along the first side of the single vibrating plate,
   the plurality of through-holes are located along an outer edge of each of the first set of piezoelectric elements in a plan view, and
   wherein the first and second sets of piezoelectric elements are provided at respective same positions corresponding to the top and bottom surfaces of the single vibrating plate.

2. The piezoelectric drive device according to claim 1, wherein each of the first set of piezoelectric elements is configured with a first piezoelectric layer and a pair of first electrodes, and the pair of first electrodes are provided on opposite surfaces of the first piezoelectric layer so that the pair of first electrodes sandwich the first piezoelectric layer.

3. The piezoelectric drive device according to claim 1, wherein tips of the plurality of first projections of the plurality of piezoelectric drive units are on a liner line parallel to the first side of the single vibrating plate.

4. The piezoelectric drive device according to claim 1, wherein each of the second set of piezoelectric elements is configured with a second piezoelectric layer and a pair of second electrodes, and the pair of second electrodes are provided on opposite surfaces of the second piezoelectric layer so that the pair of second electrodes sandwich the second piezoelectric layer.

5. The piezoelectric drive device according to claim 2, wherein each of the first set of piezoelectric elements further has a first substrate, and
   one of the pair of first electrodes is formed on the first substrate, the first piezoelectric layer is formed on one of the pair of first electrodes, and the other of the pair of first electrodes is formed on the first piezoelectric layer.

6. The piezoelectric drive device according to claim 5, wherein the single vibrating plate and the first substrate are formed as a monolithic layer.

7. The piezoelectric drive device according to claim 6, wherein the monolithic layer is a silicon substrate.

* * * * *